(12) United States Patent
Seo

(10) Patent No.: US 12,481,328 B2
(45) Date of Patent: Nov. 25, 2025

(54) DISPLAY DEVICE WITH SLIDABLE ROLL AXIS FOR DISPLAY PANEL

(71) Applicant: Samsung Display Co., LTD., Yongin-si (KR)

(72) Inventor: Tae An Seo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 310 days.

(21) Appl. No.: 18/313,618

(22) Filed: May 8, 2023

(65) Prior Publication Data

US 2024/0103580 A1    Mar. 28, 2024

(30) Foreign Application Priority Data

Sep. 23, 2022    (KR) .......................... 10-2022-0120942

(51) Int. Cl.
*G06F 1/16* (2006.01)
*H04M 1/02* (2006.01)

(52) U.S. Cl.
CPC .......... *G06F 1/1656* (2013.01); *G06F 1/1616* (2013.01); *G06F 1/1624* (2013.01); *H04M 1/0214* (2013.01); *H04M 1/0235* (2013.01)

(58) Field of Classification Search
CPC ............. H04M 1/0268; H04M 1/0214; H04M 1/0216; H04M 1/022; H04M 1/0235; H04M 1/0237; H04M 1/0247; G06F 1/1656; G06F 1/1616; G06F 1/1624; G06F 1/1652; G06F 1/1641; G06F 1/1681; G06F 1/1637; G06F 1/1626; H05K 5/0217; H05K 2201/10128; G09F 9/301; H10K 2102/311; H10K 50/84; F16C 11/04

See application file for complete search history.

(56) References Cited

U.S. PATENT DOCUMENTS 9,013,864 B2 *   4/2015  Griffin ................ H04M 1/0235
                                                    16/382
9,164,547 B1 *  10/2015  Kwon ................... G06F 1/1652
9,348,450 B1 *   5/2016  Kim ..................... H04M 1/0268
(Continued)

FOREIGN PATENT DOCUMENTS

CN         209232315 U  *  8/2019
CN         111402727 A  *  7/2020 ............. G05D 16/16
(Continued)

*Primary Examiner* — Imani N Hayman
*Assistant Examiner* — Hung Q Dang
(74) *Attorney, Agent, or Firm* — F. Chau & Associates, LLC

(57) ABSTRACT

A display device includes a support plate supporting a bottom surface of a display panel, the support plate including a first plate portion overlapping a first active area in plan view and a first grid pattern portion overlapping a second active area in plan view and having slits through the support plate, and segment bodies on a bottom surface of the first grid pattern portion of the support plate, extending in a second direction intersecting the first direction, and spaced apart from each other in the first direction, the segment bodies include a first segment body and a second segment body adjacent to the first segment body, and at least a portion of the first segment body and at least a portion of the second segment body are connected through a first connection portion therebetween.

20 Claims, 25 Drawing Sheets

PNL: PNLa, PNLb, PNLc, PNLd, SBA
SP: MP, SG

(56) References Cited

U.S. PATENT DOCUMENTS

| | | | |
|---|---|---|---|
| 10,747,269 B1* | 8/2020 | Choi | G06F 1/1652 |
| 2006/0176243 A1* | 8/2006 | Yeh | G06F 1/1624 |
| | | | 345/30 |
| 2013/0010405 A1* | 1/2013 | Rothkopf | G06F 1/1681 |
| | | | 361/679.01 |
| 2013/0216740 A1* | 8/2013 | Russell-Clarke | B21D 31/04 |
| | | | 219/121.72 |
| 2014/0126121 A1* | 5/2014 | Griffin | G06F 1/1652 |
| | | | 361/679.01 |
| 2016/0127525 A1* | 5/2016 | Lee | G06F 1/1652 |
| | | | 455/575.1 |
| 2016/0299532 A1* | 10/2016 | Gheorghiu | E05D 1/00 |
| 2017/0060188 A1* | 3/2017 | Han | G06F 1/1641 |
| 2017/0365197 A1* | 12/2017 | Kim | G06F 1/1641 |
| 2018/0081473 A1* | 3/2018 | Seo | G06F 1/3287 |
| 2018/0102072 A1* | 4/2018 | Lee | G09G 3/20 |
| 2019/0132987 A1* | 5/2019 | Koo | H05K 7/18 |
| 2019/0196548 A1* | 6/2019 | Kim | G06F 1/1681 |
| 2019/0265758 A1* | 8/2019 | Han | G06F 1/1681 |
| 2019/0305237 A1* | 10/2019 | Shin | G06F 3/041 |
| 2019/0305238 A1* | 10/2019 | Shin | H10K 59/87 |
| 2020/0152095 A1* | 5/2020 | Lee | G09F 9/301 |
| 2020/0170127 A1* | 5/2020 | Kim | H05K 5/0226 |
| 2020/0314225 A1* | 10/2020 | Ahn | G06F 1/1652 |
| 2021/0127506 A1* | 4/2021 | Sim | H10K 50/84 |
| 2021/0280097 A1* | 9/2021 | Lee | G09F 9/301 |
| 2021/0389809 A1* | 12/2021 | Choi | G06F 1/1681 |
| 2022/0155823 A1* | 5/2022 | Shin | G09F 9/301 |
| 2022/0189348 A1* | 6/2022 | Wu | G06F 1/1641 |
| 2022/0192041 A1* | 6/2022 | Jeon | G06F 1/1681 |
| 2022/0217857 A1* | 7/2022 | Li | G06F 1/1652 |
| 2022/0221907 A1* | 7/2022 | Cai | G06F 1/1624 |
| 2022/0236767 A1* | 7/2022 | Zhang | G06F 1/1681 |
| 2022/0236773 A1* | 7/2022 | Kim | G06F 1/1652 |
| 2022/0270522 A1* | 8/2022 | Afsar | G09F 9/33 |
| 2022/0295650 A1* | 9/2022 | Shang | H05K 5/0217 |
| 2022/0418126 A1* | 12/2022 | Lee | G06F 1/1624 |
| 2023/0072326 A1* | 3/2023 | Li | H05K 5/0217 |
| 2023/0074489 A1* | 3/2023 | Sun | G06F 1/203 |
| 2023/0095247 A1* | 3/2023 | Feng | G06F 1/1624 |
| | | | 361/679.27 |
| 2023/0156116 A1* | 5/2023 | Yoon | G09F 9/30 |
| | | | 455/575.4 |
| 2023/0229191 A1* | 7/2023 | Zhao | H04M 1/0237 |
| | | | 361/679.01 |
| 2024/0003482 A1* | 1/2024 | Lee | G06F 1/1658 |
| 2024/0029592 A1* | 1/2024 | Wu | G06F 1/1652 |
| 2024/0143032 A1* | 5/2024 | Wang | G06F 1/1652 |
| 2024/0155788 A1* | 5/2024 | Huang | H04M 1/0268 |
| 2024/0188376 A1* | 6/2024 | Wei | H10K 59/80 |
| 2024/0410416 A1* | 12/2024 | Zhou | H05K 5/0226 |

FOREIGN PATENT DOCUMENTS

| | | | | |
|---|---|---|---|---|
| CN | 112150931 A | * | 12/2020 | G09F 9/301 |
| CN | 214312454 U | * | 9/2021 | G09F 9/301 |
| CN | 114220350 A | * | 3/2022 | G09F 9/301 |
| CN | 114495699 A | * | 5/2022 | G09F 9/301 |
| CN | 216697688 U | * | 6/2022 | |
| CN | 115499528 A | * | 12/2022 | H04M 1/0235 |
| CN | 116884212 A | * | 10/2023 | |
| KR | 10-2018-0040481 | | 4/2018 | |
| KR | 2019050325 A | * | 5/2019 | G06F 1/1616 |
| KR | 10-2256292 | | 5/2021 | |
| KR | 10-2256681 | | 5/2021 | |
| KR | 10-2021-0083442 | | 7/2021 | |
| KR | 10-2022-0014807 | | 2/2022 | |
| KR | 10-2022-0030865 | | 3/2022 | |
| KR | 10-2022-0058185 | | 5/2022 | |
| KR | 10-2022-0061785 | | 5/2022 | |
| KR | 2023034436 A | * | 3/2023 | A61L 31/022 |
| WO | WO-2019153256 A1 | * | 8/2019 | |
| WO | WO-2021121097 A1 | * | 6/2021 | H04M 1/0268 |
| WO | WO-2022025671 A1 | * | 2/2022 | G06F 1/1607 |
| WO | WO-2025033664 A1 | * | 2/2025 | G06F 1/1624 |

* cited by examiner

SD: SD1, SD2, SD3, HG

LK_3: LK_3a, LK_3b, LK_3c

LK_4: LK_4a, LK_4b

LK_5: LK_5a, LK_5b, LK_5c, LK_5d

LK_7: LK_7a, LK_7b, LK_7c

PNL_8: PNL_8a, PNL_8b, PNL_8c, SBA_8

SP_8: MP_8, SG
MP_8: PL_8, LP1_8, LP2_8

DISPLAY DEVICE WITH SLIDABLE ROLL AXIS FOR DISPLAY PANEL

CROSS-REFERENCE TO RELATED APPLICATION(S)

This application claims priority to and benefits of Korean Patent Application No. 10-2022-0120942 under 35 U.S.C. § 119 filed on Sep. 23, 2022 in the Korean Intellectual Property Office, the entire contents of which are incorporated herein by reference.

BACKGROUND

1. Technical Field

The disclosure relates to a display device.

2. Description of the Related Art

The importance of a display device is increasing with the development of multimedia. Accordingly, various types of display devices such as an organic light emitting display (OLED) and a liquid crystal display (LCD) are being used.

In recent years, with the development of display technology, research and development of a display device having a flexible display are being actively conducted. The flexible display may extend or reduce a display screen, for example, fold, bend, or slide the display screen, thereby significantly contributing to a decrease in volume or a change in design of the display device.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a display device capable of having improved device reliability.

However, aspects of the disclosure are not restricted to those set forth herein. The above and other aspects of the disclosure will become more apparent to one of ordinary skill in the art to which the disclosure pertains by referencing the detailed description of the disclosure given below.

An embodiment of a display device may include a display device including a display panel including a first active area and a second active area disposed on a side of the first active area and slid in a first direction; a support plate supporting a bottom surface of the display panel, the support plate including a first plate portion overlapping the first active area in plan view; and a first grid pattern portion overlapping the second active area in plan view and having slits penetrating through the support plate; and segment bodies disposed on a bottom surface of the first grid pattern portion of the support plate, extending in a second direction intersecting the first direction, and spaced apart from each other in the first direction, wherein the segment bodies include a first segment body and a second segment body adjacent to the first segment body, and at least a portion of the first segment body and at least a portion of the second segment body are connected through a first connection portion disposed between the at least a portion of the first segment body and at least a portion of the second segment body.

Each of the first segment body and the second segment body may include a protrusion area protruding from the first grid pattern portion of the support plate in the second direction, and the first connection portion integrally connects the protrusion area of the first segment body and the protrusion area of the second segment body.

Each of the first segment body and the second segment body may include a support area overlapping the first grid pattern portion of the support plate in plan view, and the support area of the first segment body and the support area of the second segment body are integrally connected through a second connection portion disposed between the support area of the first segment body and the support area of the second segment body.

The first segment body, the second segment body, and the first connection portion may include a same material.

The first grid pattern portion may include a pattern portion including the slits; and a flat plate portion including the segment bodies, and the pattern portion and the flat plate portion are alternately and repeatedly disposed.

The segment bodies may include an attachment portion attached to the flat plate portion; and a body portion disposed on a lower side of the attachment portion, and a width of the attachment portion is less than a width of the body portion.

The attachment portion of the first segment body and the attachment portion of the second segment body may be integrally connected through the first connection portion, and the body portion of the first segment body and the body portion of the second segment body are spaced apart from each other in the first direction.

The first connection portion may have a shape bent at least once.

The display panel may further include a folding area disposed on another side of the first active area and folded based on a folding axis in the second direction; and a third active area disposed opposite to the first active area with the folding area disposed between the third active area and the first active area, and the support plate may include a second plate portion overlapping the third active area in plan view, and a second grid pattern portion overlapping the folding area in plan view and having slits penetrating through the support plate.

A thickness of the support plate may be less than a thickness of the segment bodies.

The thickness of the support plate may be about 100 μm or more and about 150 μm or less, and the thickness of the segment bodies may be about 0.4 mm or more and about 1.3 mm or less.

The segment bodies may not overlap the second grid pattern portion in plan view.

An embodiment of a display device may include a display device including a display panel including a planarization area and a bendable area adjacent to the planarization area in a first direction; a plate supporting a bottom surface of the planarization area of the display panel; and segment bodies supporting the bendable area of the display panel, extending in a second direction intersecting the first direction and spaced apart from each other in the first direction, and including a protrusion area protruding from the bendable area in the second direction, wherein the segment bodies include a first segment body and a second segment body adjacent to the first segment body, and the protrusion area of the first segment body and the protrusion area of the second segment body are connected through a first connection portion disposed between the protrusion area of the first segment body and the protrusion area of the second segment body.

Each of the first segment body and the second segment body may include a support area overlapping the bendable area of the display panel in plan view, and the support area of the first segment body and the support area of the second segment body are integrally connected through a second connection portion disposed between the support area of the first segment body and the support area of the second segment body.

The first connection portion may prevent deformation of the first segment body and the second segment body that occur as the bendable area of the display panel is bent.

The segment bodies may include an attachment portion attached to a bottom surface of the bendable area of the display panel and a body portion disposed on a lower side of the attachment portion, and a width of the attachment portion is less than a width of the body portion.

The attachment portion of the first segment body and the attachment portion of the second segment body may be integrally connected through the first connection portion, and the body portion of the first segment body and the body portion of the second segment body are spaced apart from each other in the first direction.

An embodiment of a display device may include a storage container for storing a display panel, the storage container may include a first storage portion; a second storage portion sliding from the first storage portion in a first direction and having a guide rail guiding a sliding of the display panel; and segment bodies extending in a second direction intersecting the first direction and including a guide area engaged with the guide rail, and spaced apart from each other in the first direction, wherein the segment bodies include a first segment body and a second segment body adjacent to the first segment body, and the guide area of the first segment body and the guide area of the second segment body are connected through a connection portion disposed between the guide area of the first segment body and the guide area of the second segment body.

The segment bodies may include a body portion and a protrusion portion protruding from the body portion in a thickness direction, and a width of the protrusion portion is less than a width of the body portion.

The protrusion portion of the first segment body and the protrusion portion of the second segment body may be integrally connected through the connection portion, and the body portion of the first segment body and the body portion of the second segment body are spaced apart from each other in the first direction.

The display device according to an embodiment may have improved device reliability.

However, the effects of the embodiments are not restricted to the ones set forth herein. The above and other effects of the embodiments will become more apparent to one of ordinary skill in the art to which the embodiments pertain by referencing the claims.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
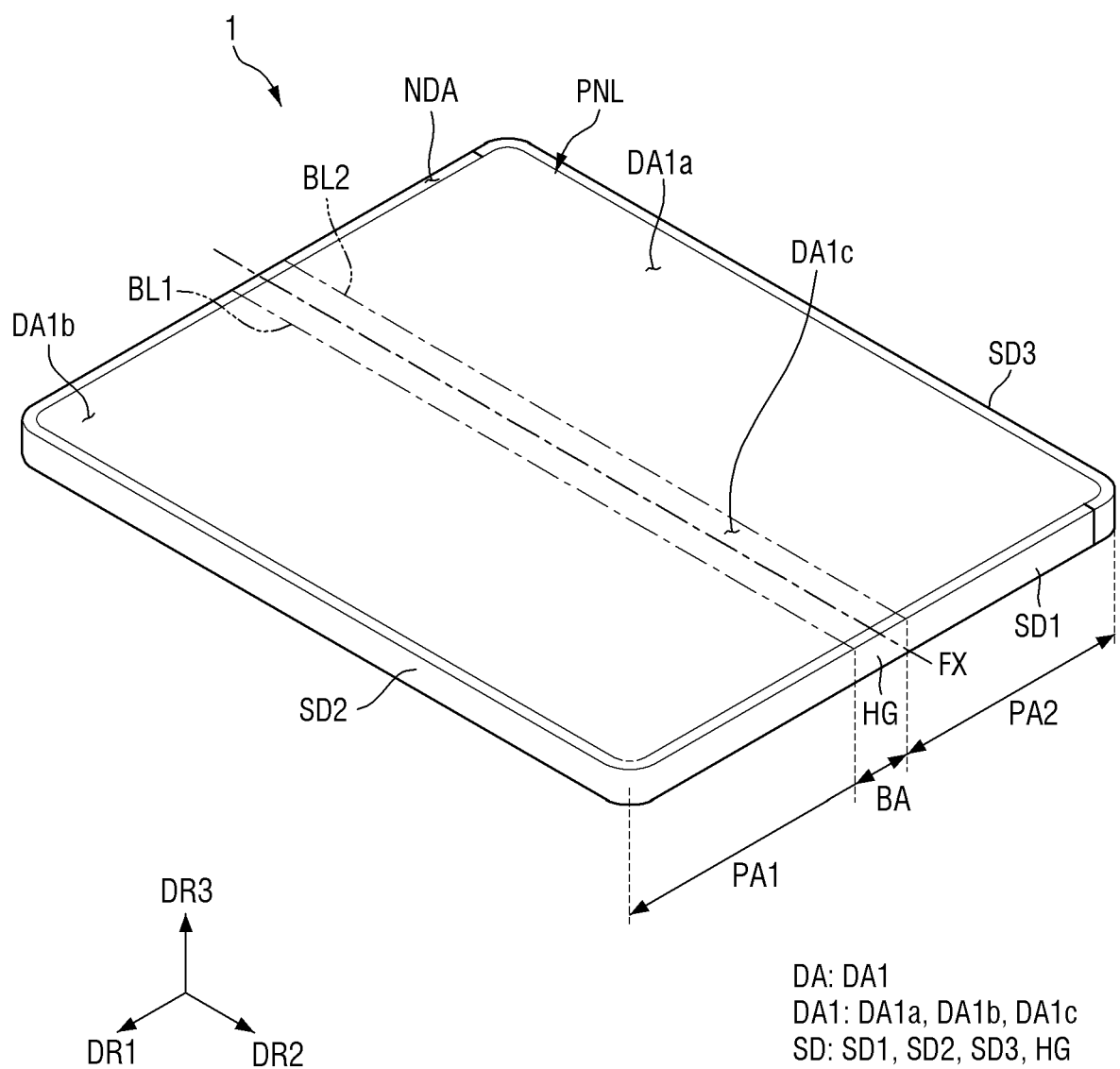
FIG. 1 is a schematic perspective view illustrating a display device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art. The same reference numbers indicate the same components throughout the specification. In the attached figures, the thickness of layers and regions is exaggerated for clarity.

For example, in the drawings, sizes, thicknesses, ratios, and dimensions of the elements may be exaggerated for ease of description and for clarity. Like numbers refer to like elements throughout.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween. It may also be understood that if one part and another part are connected, they may or may not be integral with each other.

It will be understood that the terms "connected to" or "coupled to" may include a physical or electrical connection or coupling.

It will be understood that, although the terms "first," "second," "third," or the like may be used herein to describe various elements, these elements should not be limited by these terms. These terms are used to distinguish one element from another element or for the convenience of description and explanation thereof. For example, when "a first element" is discussed in the description, it may be termed "a second element" or "a third element," and "a second element" and "a third element" may be termed in a similar manner without departing from the teachings herein.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Each of the various embodiments may be partially or wholly combined, and each embodiment may be able to be performed independently with respect to each other or may be implemented together within the spirit and the scope of the disclosure.

Hereinafter, embodiments will be described with reference to the accompanying drawings.

Figure 2:
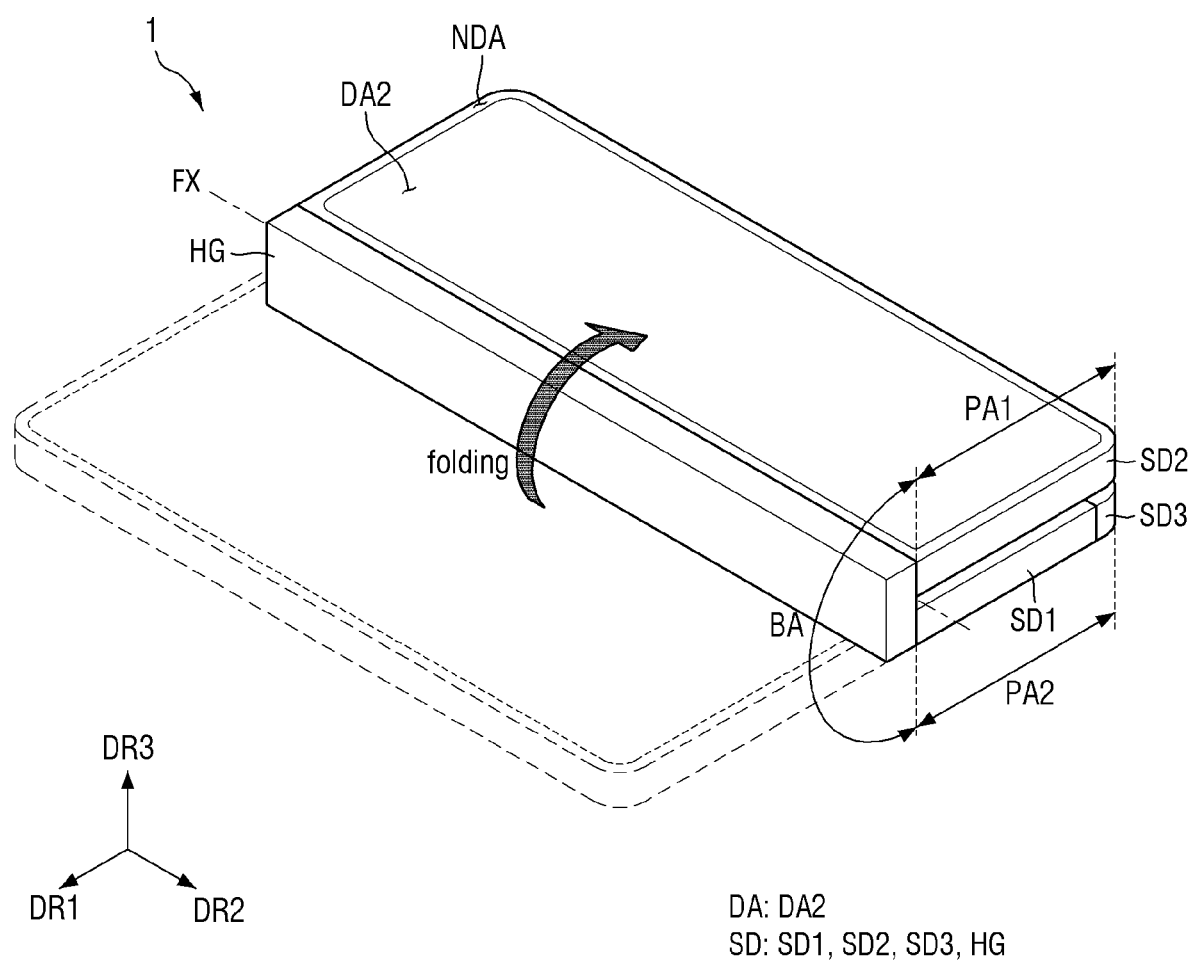
FIG. 2 is a schematic perspective view illustrating a folded state of the display device according to an embodiment.
Figure 3:
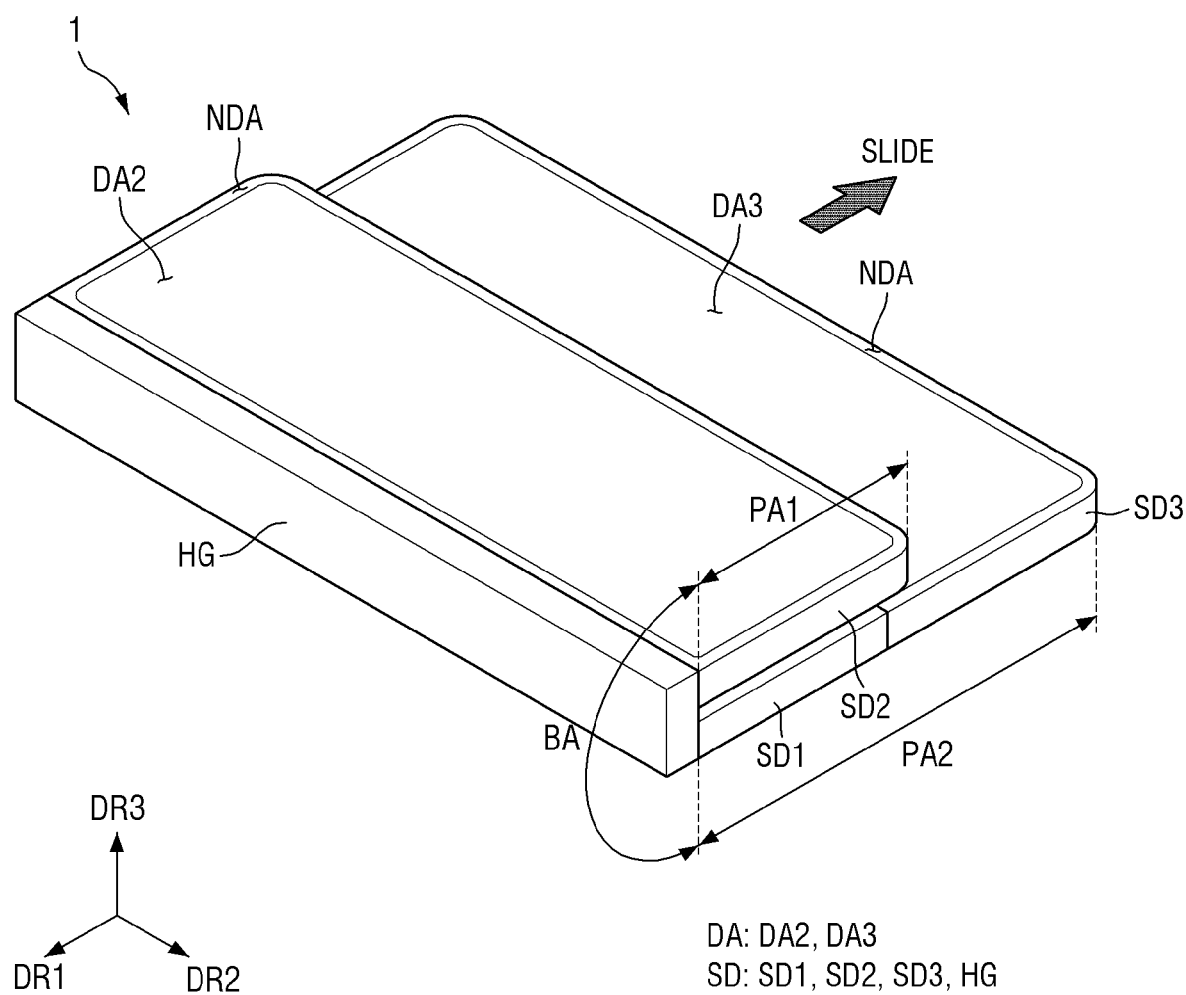
FIG. 3 is a schematic perspective view illustrating a slide state of the display device according to an embodiment.

FIG. 1 is a schematic perspective view illustrating a display device according to an embodiment. FIG. 2 is a schematic perspective view illustrating a folded state of the display device according to an embodiment. FIG. 3 is a schematic perspective view illustrating a slide state of the display device according to an embodiment.

In FIG. 1, a first direction DR1, a second direction DR2, and a third direction DR3 are defined. The first direction DR1 and the second direction DR2 may be perpendicular to each other, the first direction DR1 and the third direction DR3 may be perpendicular to each other, and the second direction DR2 and the third direction DR3 may be perpendicular to each other. It may be understood that the first direction DR1 means a horizontal direction in the drawings, the second direction DR2 means a vertical direction in the drawings, and the third direction DR3 means upper and lower directions in the drawings, for example, a thickness direction. In the following specification, unless otherwise specified, the term "direction" may refer to both directions toward both sides extending along the direction. In case that both "directions" extending to both sides need to be distinguished from each other, one side will be referred to as "one side or a side in the direction" and the other side will be referred to as "the other side or another side in the direction". In FIG. 1, a direction in which an arrow indicating a direction is directed is referred to as one side or a side, and an opposite direction thereof is referred to as the other side or another side.

Referring to FIGS. 1 to 3, a display device 1 displays a moving image or a still image. The display device 1 may refer to any electronic device that provides a display screen. For example, the display device 1 may include televisions, laptop computers, monitors, billboards, Internet of things, mobile phones, smartphones, tablet personal computers (PCs), electronic watches, smartwatches, watch phones, head mounted displays, mobile communication terminals, electronic notebooks, electronic books, portable multimedia players (PMPs), navigation, game consoles, digital cameras, camcorders, and the like that provide the display screen.

The display device 1 according to an embodiment may include a first planarization portion PA1, a second planarization portion PA2, and a bending portion BA. The bending portion BA may be disposed on one side or a side of the first planarization portion PA1 in the first direction DR1, and the second planarization portion PA2 may be disposed on one side or a side of the bending portion BA in the first direction DR1. The first planarization portion PA1 and the second planarization portion PA2 may be portions that are not bent, and the bending portion BA may be a bendable portion. The second planarization portion PA2 may be expanded. An operation of the display device 1 will be described later.

The display device 1 according to an embodiment may include a display panel PNL and a panel storage container SD.

The panel storage container SD may include a first storage container SD1, a second storage container SD2, a third storage container SD3, and a hinge HG. The hinge HG may be disposed on one side or a side of the first storage container SD1 in the first direction DR1, and the second storage container SD2 may be disposed on one side or a side of the hinge HG in the first direction DR1. The third storage container SD3 may be disposed on the other side or another side of the first storage container SD1 in the first direction DR1. In other words, the second storage container SD2 may be disposed on the first planarization portion PA1 of the display device 1, the first storage container SD1 and the third storage container SD3 may be disposed on the second planarization portion PA2 thereof, and the hinge HG may be disposed on the bending portion BA.

The display panel PNL is a panel that displays a screen, and any type of display panel such as an organic light emitting display panel including an organic light emitting layer, a micro light emitting diode (LED) display panel using a micro light emitting diode, a quantum dot light emitting display panel using a quantum dot light emitting diode including a quantum dot light emitting layer, and an inorganic light emitting display panel using an inorganic light emitting element including an inorganic semiconductor may be applied as the display panel PNL according to an embodiment.

The display panel PNL may be stored in the panel storage container SD and partially exposed from the panel storage container SD, and the exposed portion of the display panel PNL, which is a display area DA of the display device 1, may provide a screen to a user in the third direction DR3. A non-display area NDA may be disposed around the display area DA. In an embodiment, the non-display area NDA may be disposed to surround the display area DA, but is not limited thereto. For example, the non-display area NDA may be adjacent to the display area DA.

Hereinafter, for convenience of explanation, in referring to surfaces of the display device 1 or each member constituting the display device 1, one surface or a surface facing one side or a side in a direction in which an image is displayed, for example, the third direction DR3 with respect to FIG. 1 is referred to as a top surface, and an opposite surface of the one surface is referred to as a bottom surface. However, the disclosure is not limited thereto, and the one surface and the other surface of the member may be referred to as a front surface and a rear surface, respectively, or may also be referred to as a first surface or a second surface. In describing a relative position of each member of the display device 1, one side or a side in the third direction DR3 may be referred to as an upper side and the other side or another side in the third direction DR3 may be referred to as a lower side.

The display device 1 according to an embodiment may be a foldable display device. For example, as illustrated in FIGS. 1 and 2, the display device 1 according to an embodiment may be folded based on a folding axis FX parallel to the second direction DR2 as a virtual axis on the bending portion BA.

As the bending portion BA of the display device 1 according to an embodiment may be disposed between the first planarization portion PA1 and the second planarization portion PA2 and bent, the display device 1 may be folded such that the first planarization portion PA1 and the second planarization portion PA2 overlap in the third direction DR3.

Referring to FIG. 1, the display device 1 may be unfolded to provide a screen to the user. For example, the display panel PNL may form a first display area DA1 as the display area DA in an unfolded state of the display device 1.

The first display area DA1 may include a first planarization display area DA1a exposed to the first storage container SD1, a second planarization display area DA1b exposed to the second storage container SD2, and a folding display area DA1c exposed to the hinge HG. In other words, the first planarization display area DA1a may be disposed on the other side or another side of the folding display area DA1c in the first direction DR1, and the second planarization display area DA1b may be disposed on one side or a side of the folding display area DA1c in the first direction DR1.

The folding display area DA1c may be distinguished from the first planarization display area DA1a and the second planarization display area DA1b based on bending lines BL1 and BL2. For example, the folding display area DA1c and the first planarization display area DA1a may be distinguished from each other based on the first bending line BL1 as a boundary, and the folding display area DA1c and the second planarization display area DA1b may be distinguished from each other based on the second bending line BL2 as a boundary.

Referring to FIG. 2, the display device 1 may be folded to provide a screen to the user. In an embodiment, the display panel PNL may form a second display area DA2 as the display area DA in a folded state of the display device 1, but is not limited thereto. For example, in case that the display device 1 is folded, the second display area DA2 may also not be formed. FIG. 2 illustrates that the second display area DA2 is formed as the display area DA in the folded state of the display device 1.

In case that the display device 1 is folded, the first display area DA1 exposed to the user in the unfolded state may not be visually recognized by the user. For example, in case that the display device 1 is folded, the first planarization display area DA1*a* and the second planarization display area DA1*b* face each other and overlap in the third direction DR3, and may not thus be visually recognized by the user.

The display device 1 according to an embodiment may be a slidable display device. For example, as illustrated in FIGS. 2 and 3, in the display device 1 according to an embodiment, the third storage container SD3 may slide from the first storage container SD1 in the first direction DR1. The second planarization portion PA2 of the display device 1 may expand to occupy a larger area than the first planarization portion PA1.

The display panel PNL may further include a third display area DA3 as the display area DA. The third display area DA3 is a slidable area and may provide a screen to the user in case that the display device 1 is slid. Accordingly, as illustrated in FIG. 3, the display device 1 according to an embodiment may provide the screen to the user through the third display area DA3 as well as the second display area DA2.

Hereinafter, each structure of the display device 1 will be described.

Figure 4:
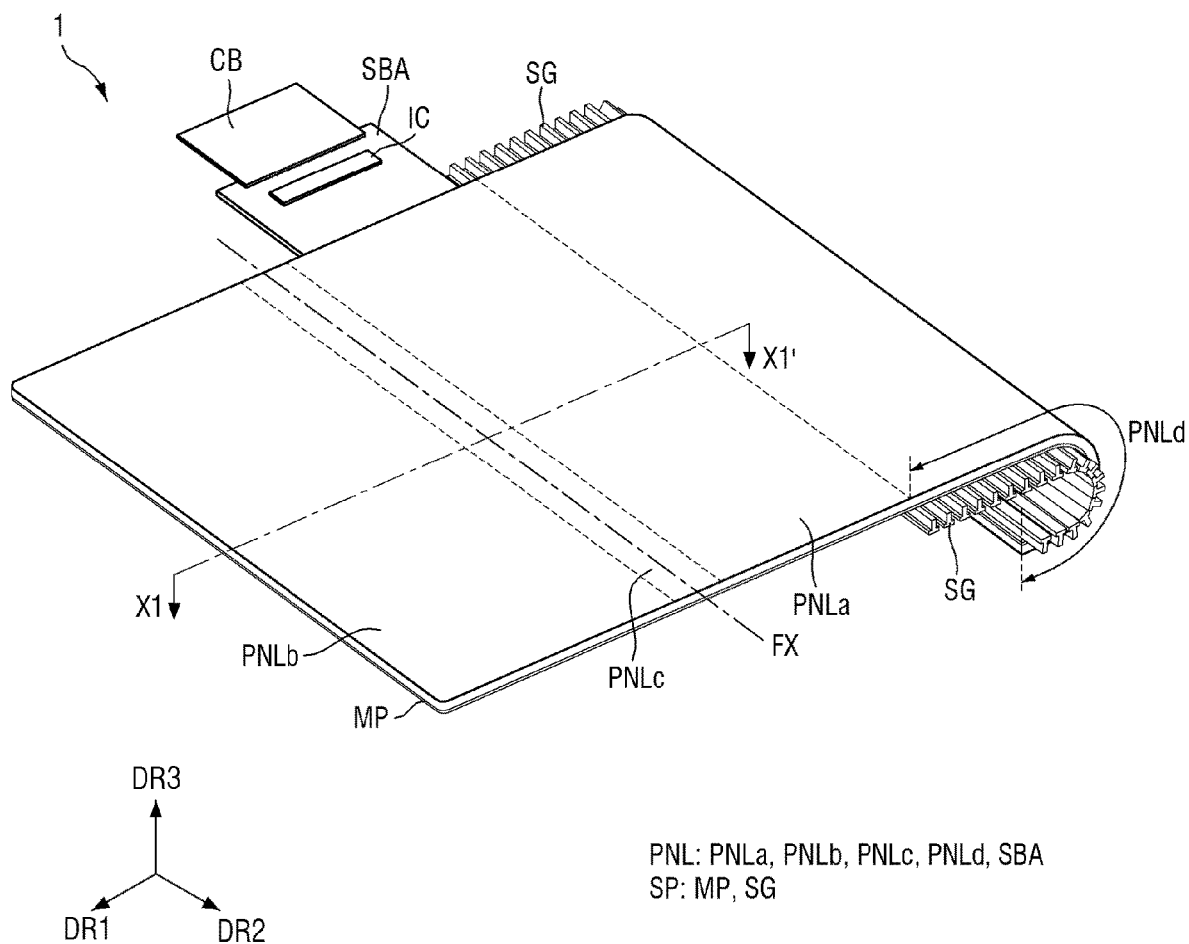
FIG. 4 is a schematic perspective view illustrating an arrangement relationship between a display panel and a panel support of the display device according to an embodiment.
Figure 5:
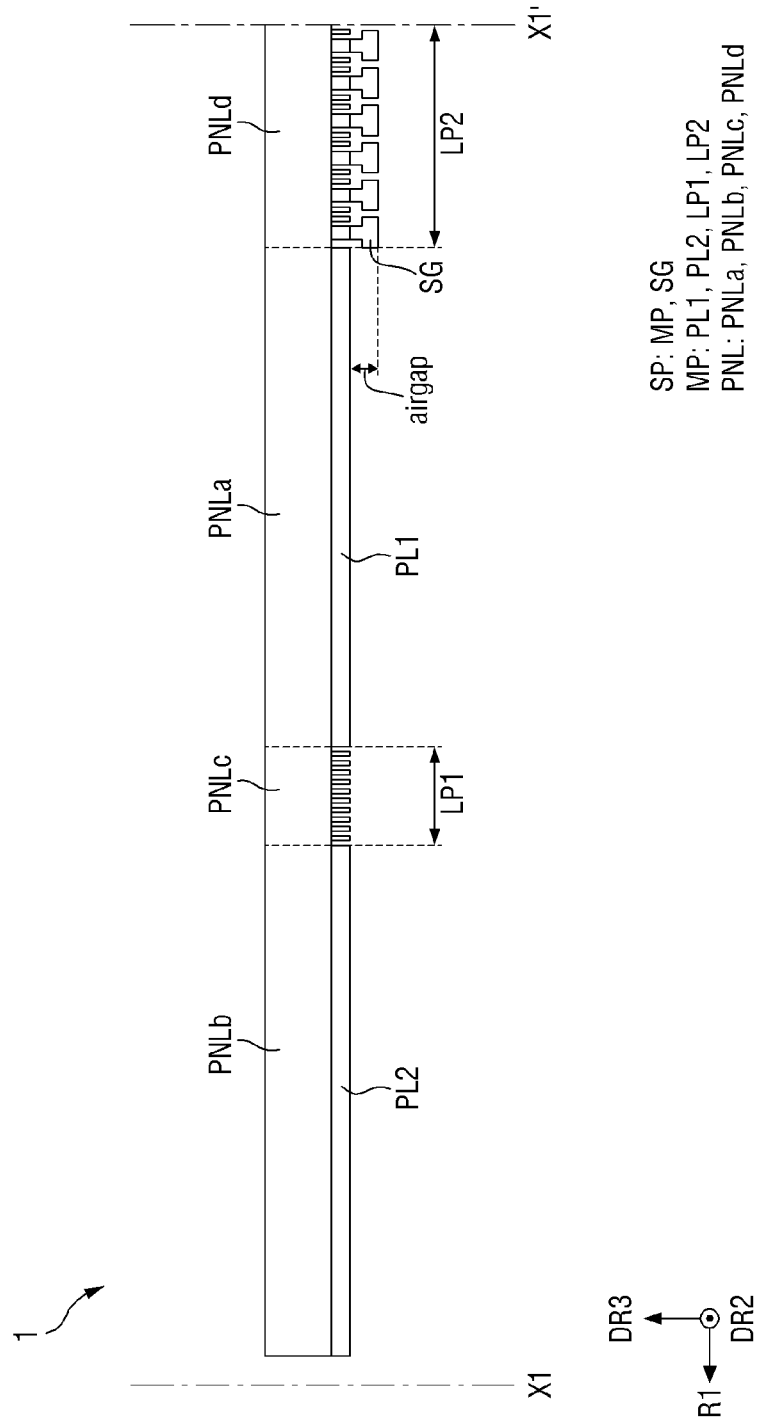
FIG. 5 is a schematic cross-sectional view illustrating a schematic cross section taken along line X1-X1' of FIG. 4.
Figure 6:
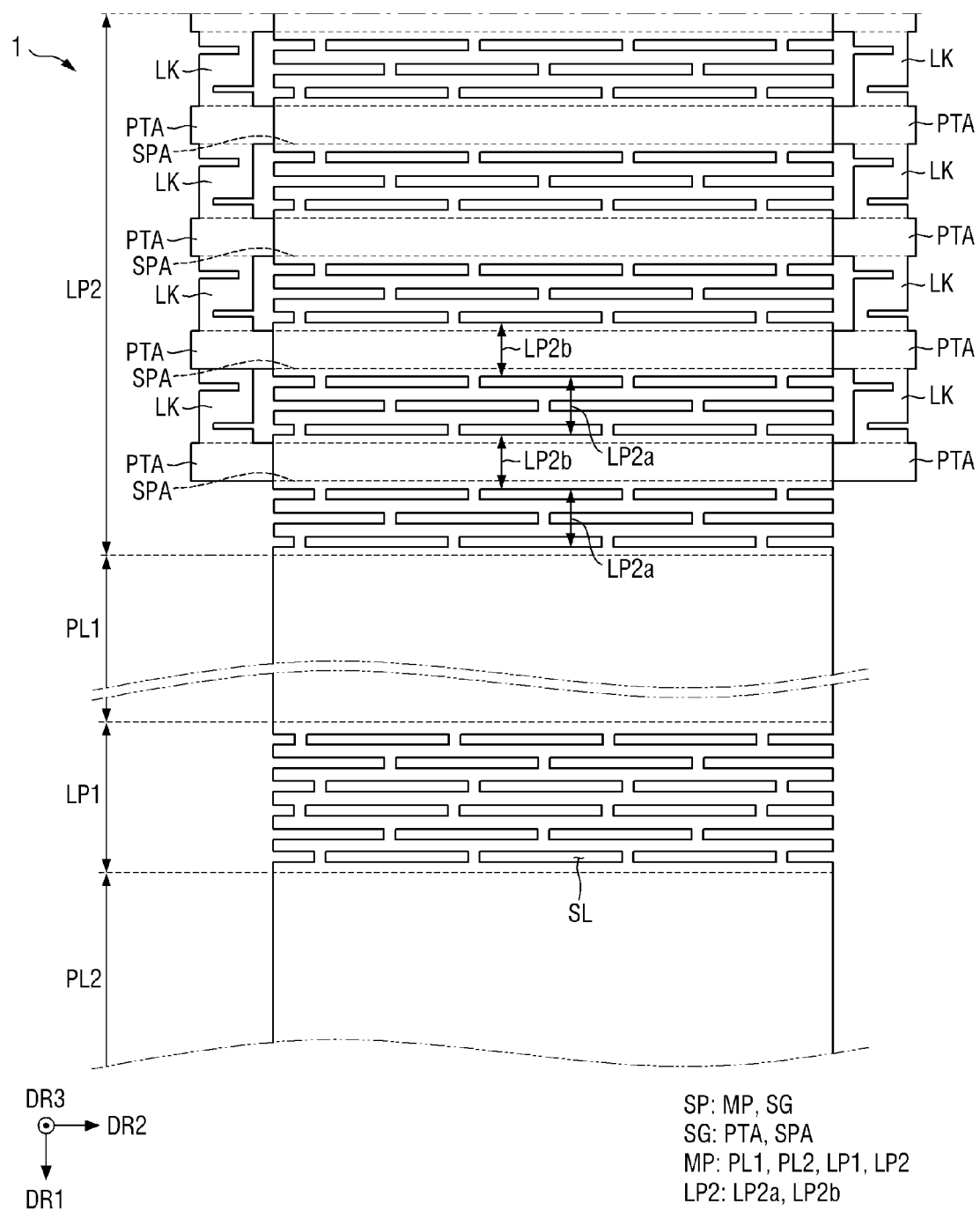
FIG. 6 is a schematic plan view illustrating a panel support of the display device according to an embodiment.
Figure 7:
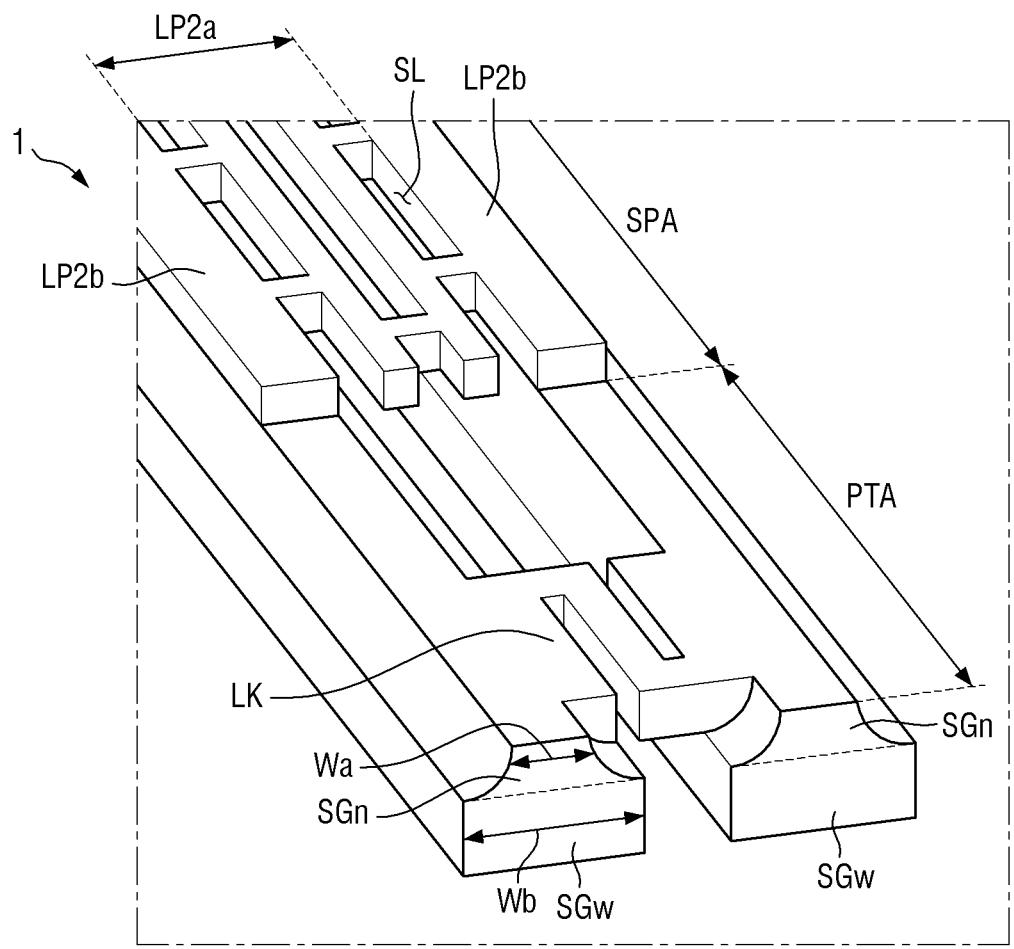
FIG. 7 is a schematic perspective view illustrating an arrangement relationship between a support plate and a segment body of the display device according to an embodiment.

FIG. 4 is a schematic perspective view illustrating an arrangement relationship between a display panel and a panel support of the display device according to an embodiment. FIG. 5 is a schematic cross-sectional view illustrating a schematic cross section taken along line X1-X1' of FIG. 4. FIG. 6 is a schematic plan view illustrating a panel support of the display device according to an embodiment. FIG. 7 is a schematic perspective view illustrating an arrangement relationship between a support plate and a segment body of the display device according to an embodiment.

Referring to FIGS. 4 to 7, the display device 1 according to an embodiment may include a display panel PNL and a panel support SP supporting a bottom surface of the display panel PNL.

The display panel PNL may include a first area PNLa, a second area PNLb, a third area PNLc, a fourth area PNLd, and a sub-area SBA.

Referring to FIG. 4 together with FIGS. 1 to 3, the first area PNLa of the display panel PNL, which is a portion disposed on the second planarization portion PA2 of the display device 1, may be partially exposed by the first storage container SD1 to form the first planarization display area DA1*a* of the first display area DA1. In the claims, the first area PNLa may be referred to as a first active area.

The second area PNLb of the display panel PNL, which is a portion disposed on the first planarization portion PA1 of the display device 1, may be partially exposed by the second storage container SD2 to form the second planarization display area DA1*b* of the first display area DA1 In the claims, the second area PNLb may be referred to as a third active area.

The third area PNLc of the display panel PNL, which is a portion disposed on the bending portion BA of the display device 1, may be partially exposed by the hinge HG to form the folding display area DA1*c* of the first display area DA1.

The third area PNLc may be an area that may be disposed between the first area PNLa and the second area PNLb and bent. In the claims, the third area PNLc may be referred to as a bending area.

The fourth area PNLd of the display panel PNL, which is a portion disposed on the second planarization portion PA2 of the display device 2, may be partially exposed by the third storage container SD3 in case that the display device 1 is slid to form the third display area DA3. The fourth area PNLd, which is a bendable area, may be slid by the structure of the panel support SP and the panel storage container SD, which will be described later. A detailed description thereof will be provided below. In the claims, the fourth area PNLd may be referred to as a second active area.

The sub-area SBA of the display panel PNL may be a portion that protrudes toward the other side or another side of the first area PNLa in the second direction DR2. The sub-area SBA may be an area that is curved or bent. In case that the sub-area SBA is bent, the sub-area SBA may overlap the first area PNLa in the third direction DR3. The sub-area SBA may have a quadrangular planar shape, or a substantially quadrangular planar shape but is not limited thereto.

In an embodiment, a length of the sub-area SBA in the second direction DR2 may be smaller than a length of the first area PNLa in the second direction DR2. For example, a length of the sub-area SBA in the first direction DR1 may be substantially the same as a length of the first area PNLa in the first direction DR1.

A driving circuit IC and a circuit board CB may be disposed on one side surface or a side surface of the sub-area SBA in the third direction DR3. The circuit board CB may be attached onto the sub-area SBA using an anisotropic conductive film (ACF). The circuit board CB may be electrically connected to a pad portion formed on the sub-area SBA. The circuit board CB may be a flexible film such as a flexible printed circuit board, a printed circuit board, or a chip on film. The driving circuit IC may be formed as an integrated circuit and be adhered onto the sub-area SBA in a chip on glass (COG) manner, a chip on plastic (COP) manner, or an ultrasonic manner. By way of example, the driving circuit IC may be adhered onto the circuit board CB.

Pixels may be disposed on a top surface of the display panel PNL to provide a screen to the user, and the panel support SP supporting the display panel PNL may be disposed on a bottom surface of the display panel PNL.

Referring to FIGS. 5 to 7, the panel support SP may include a support plate MP and segment bodies SG.

The support plate MP of the panel support SP may entirely support the bottom surface of the display panel PNL. The support plate MP may include a first plate portion PL1, a second plate portion PL2, a first grid pattern portion LP1, and a second grid pattern portion LP2.

The first plate portion PL1 of the support plate MP may support a bottom surface of the first area PNLa of the display panel PNL. The first plate portion PL1 having a flat plate shape parallel to a plane formed by the first direction DR1 and the second direction DR2 may support the first area PNLa so that the first area PNLa is not bent.

The second plate portion PL2 of the support plate MP may support a bottom surface of the second area PNLb of the display panel PNL. The second plate portion PL2 may be disposed on one side or a side of the first plate portion PL1 in the first direction DR1. The second plate portion PL2 having a flat plate shape parallel to a plane formed by the first direction DR1 and the second direction DR2 may support the second area PNLb so that the second area PNLb is not bent.

The first grid pattern portion LP1 of the support plate MP may support a bottom surface of the third area PNLc of the display panel PNL. The first grid pattern portion LP1 may be disposed between the first plate portion PL1 and the second plate portion PL2. Slits SL penetrating through the first grid pattern portion LP1 may be continuously formed in the first grid pattern portion LP1. Accordingly, the third area PNLc of the display panel PNL may be easily bent and the bottom surface thereof may be supported.

The second grid pattern portion LP2 of the support plate MP may support a bottom surface of the fourth area PNLd of the display panel PNL. The second grid pattern portion LP2 may be disposed on the other side or another side of the first plate portion PL1 in the first direction DR1. The second grid pattern portion LP2 may include a pattern portion LP2a in which slits SL penetrating through the second grid pattern portion LP2 are formed and a flat plate portion LP2b in which the slits SL are not formed. The pattern portion LP2a and the flat plate portion LP2b may be alternately and repeatedly disposed in the first direction DR1. Segment bodies SG may be attached to the flat plate portion LP2b. With the configuration described above, a sliding operation of the fourth area PNLd of the display panel PNL may be facilitated and the bottom surface thereof may be supported.

In an embodiment, the support plate MP may include a metal material such as SUS304, but is not limited thereto. In an embodiment, a thickness of the support plate MP may be about 100 μm or more and about 150 μm or less, but is not limited thereto.

The segment bodies SG may be disposed on the bottom surface of the support plate MP. For example, the segment bodies SG may be disposed on the flat plate portion LP2b of the second grid pattern portion LP2 of the support plate MP as described above. The segment bodies SG may each extend in the second direction DR2 and may be disposed to be spaced apart from each other in the first direction DR1.

The segment bodies SG may protrude from the support plate MP to both sides in the second direction DR2. For example, each of the segment bodies SG may include a support area SPA overlaps the flat plate portion LP2b of the second grid pattern portion LP2 of the support plate MP in the third direction DR3 and a protrusion area PTA protruding from the flat plate portion LP2b in the second direction DR2.

The support area SPA of each of the segment bodies SG may be attached to the flat plate portion LP2b of the second grid pattern portion LP2 of the support plate MP to support the bottom of the fourth area PNLd of the display panel PNL. Unlike the first grid pattern portion LP1, since the bent portion of the second grid pattern portion LP2 varies according to the slide operation of the display device 1, mechanical stability of the second grid pattern portion LP2 may be weaker than that of the first grid pattern portion LP1. Accordingly, by additionally disposing the segment bodies SG on the second grid pattern portion LP2, the mechanical stability of the second grid pattern portion LP2 may be improved.

The protrusion area PTA of each of the segment bodies SG may protrude from the second grid pattern portion LP2 of the support plate MP in the second direction DR2 to be exposed. The protrusion area PTA of each of the segment bodies SG may be engaged with a guide rail GR (see FIG. 9) formed in the panel storage container SD to guide a sliding behavior of the display panel PNL. A description thereof will be provided later. In the claims, as an example, the protrusion area PTA may be referred to as a guide area.

The protrusion area PTA of each of the segment bodies SG may be connected to the protrusion area PTA of the segment body SG adjacent thereto through a connection portion LK. Accordingly, it is possible to prevent the segment bodies SG from being separated from the display panel PNL due to the bending of the display panel PNL. A detailed description thereof will be provided below.

In an embodiment, the segment bodies SG may have a shape in which an upper width thereof is smaller than a lower width thereof, but is not limited thereto. For example, the segment bodies SG may have a shape in which a width becomes narrower toward a lower portion thereof.

FIGS. 5 and 7 illustrate that the segment bodies SG have a convex shape or a substantially convex shape as a shape in which an upper width thereof is smaller than a lower width thereof. Each of the segment bodies SG may include an attachment portion SGn attached to the support plate MP and a body portion SGw disposed on a lower side of the attachment portion SGn. The attachment portion SGn of each of the segment bodies SG and the flat plate portion LP2b of the support plate MP may be welded, but the disclosure is not limited thereto, and the attachment portion SGn and the flat plate portion LP2b may also be attached by a separate attachment member interposed therebetween.

The attachment portion SGn, which is a portion protruding from the body portion SGw, may have a width Wa in the first direction DR1 that is smaller than a width Wb of the body portion SGw in the first direction DR1. Accordingly, since the rigidity of the segment body SG itself is secured by the body portion SGw while facilitating the bending of the display panel PNL by increasing an area of the pattern portion LP2a of the second grid pattern portion LP2 by relatively reducing an area where the segment bodies SG are attached to the support plate MP, it is possible to prevent the segment bodies SG from being bent in the area where the display panel PNL is bent. A description thereof will be provided later.

In an embodiment, the segment bodies SG may include a metal material such as SUS 304. In an embodiment, the segment bodies SG may be about 0.4 mm or more and about 1.3 mm or less, but is not limited thereto.

As described above, the connection portion LK may connect the protrusion areas PTA of the segment bodies SG adjacent to each other among the segment bodies SG. In an embodiment, the connection portion LK may be integral with the attachment portion SGn of each of the segment bodies SG adjacent to each other to connect the segment bodies SG adjacent to each other, but is not limited thereto. In the case where the connection portion LK is integral with the segment bodies SG, the connection portion LK may be formed simultaneously with the segment body SG in a process of forming the segment bodies SG without performing a separate process of forming the connection portion LK. Therefore, there is an advantage in the manufacturing process, and since the separate attachment member is not required, mechanical stability of the connection portion LK itself may be secured.

As illustrated in FIG. 5, an air gap may be formed on the other side or another side of the first plate portion PL1 in the third direction DR3. As the air gap is formed on a lower side of the first plate portion PL1, a shock applied to the display panel PNL may be reduced. For example, in case that an object such as a user's pen falls on the first area PNLa of the display panel PNL, the air gap may absorb a shock resulting therefrom.

Hereinafter, a structure in which the panel storage container SD and the segment bodies SG are engaged to guide a sliding operation of the display panel PNL will be described.

Figure 8:
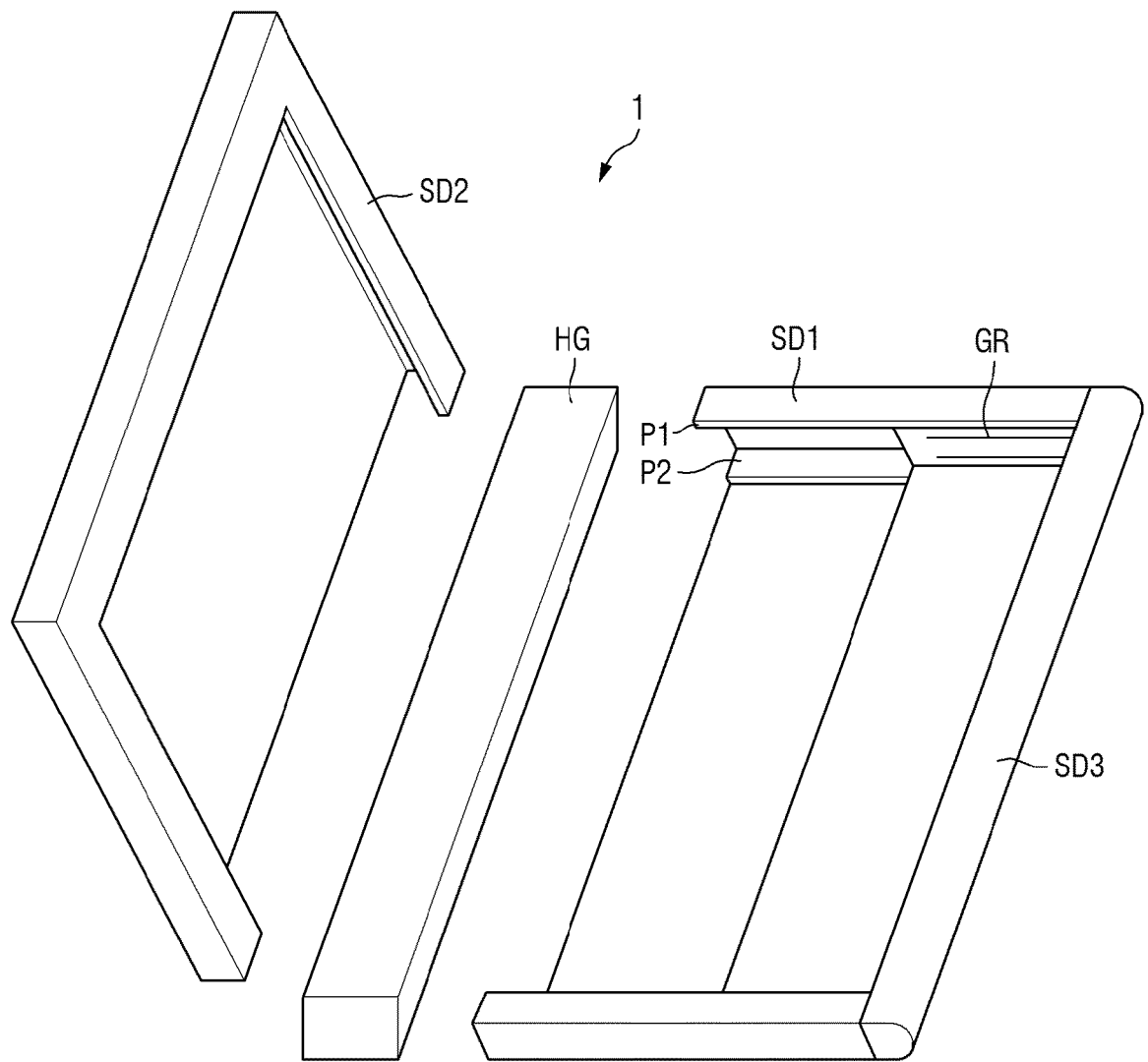
FIG. 8 is a schematic perspective view illustrating a panel storage container of the display device according to an embodiment.
Figure 9:
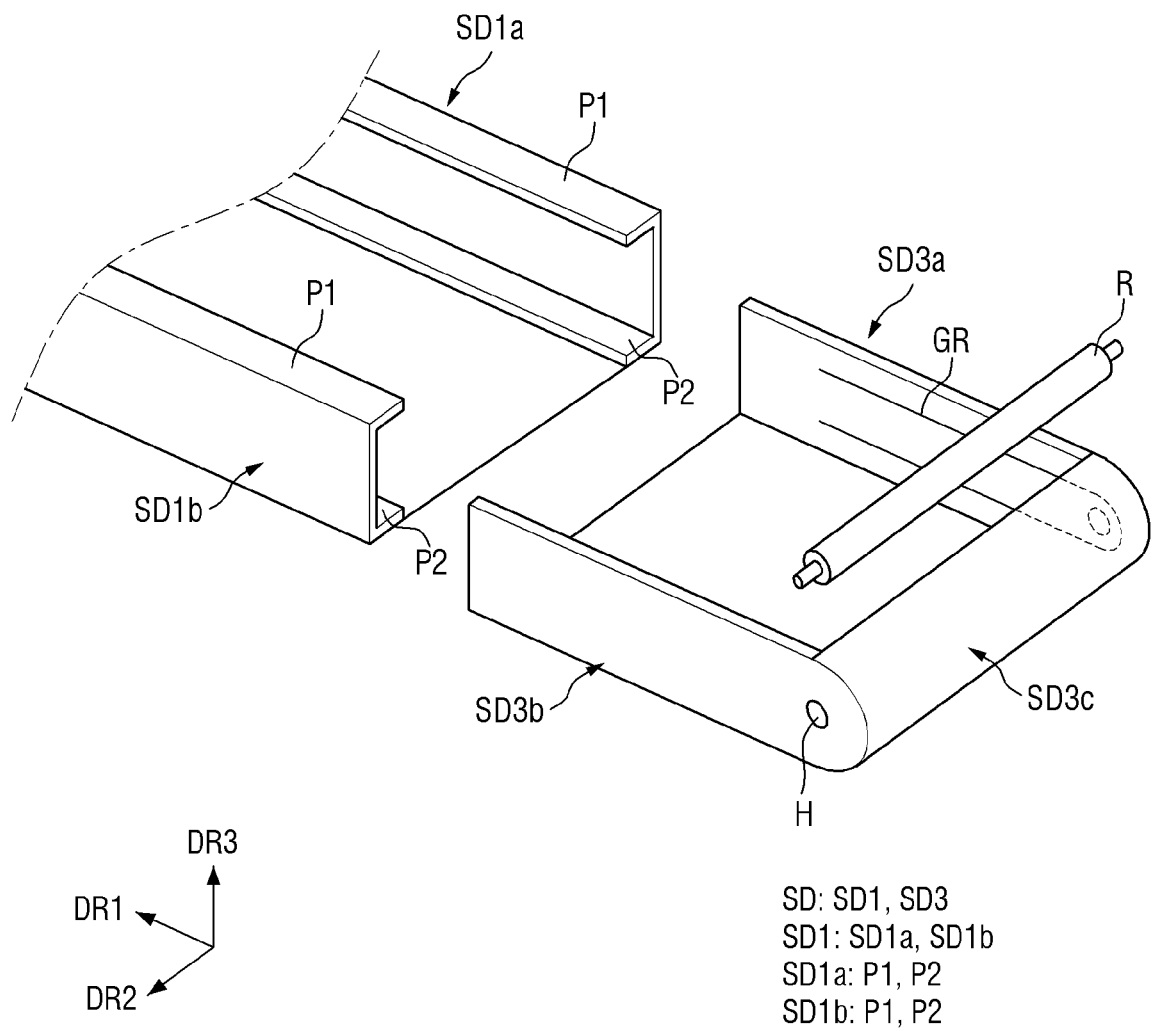
FIG. 9 is an exploded perspective view illustrating the panel storage container of the display device according to an embodiment.
Figure 10:
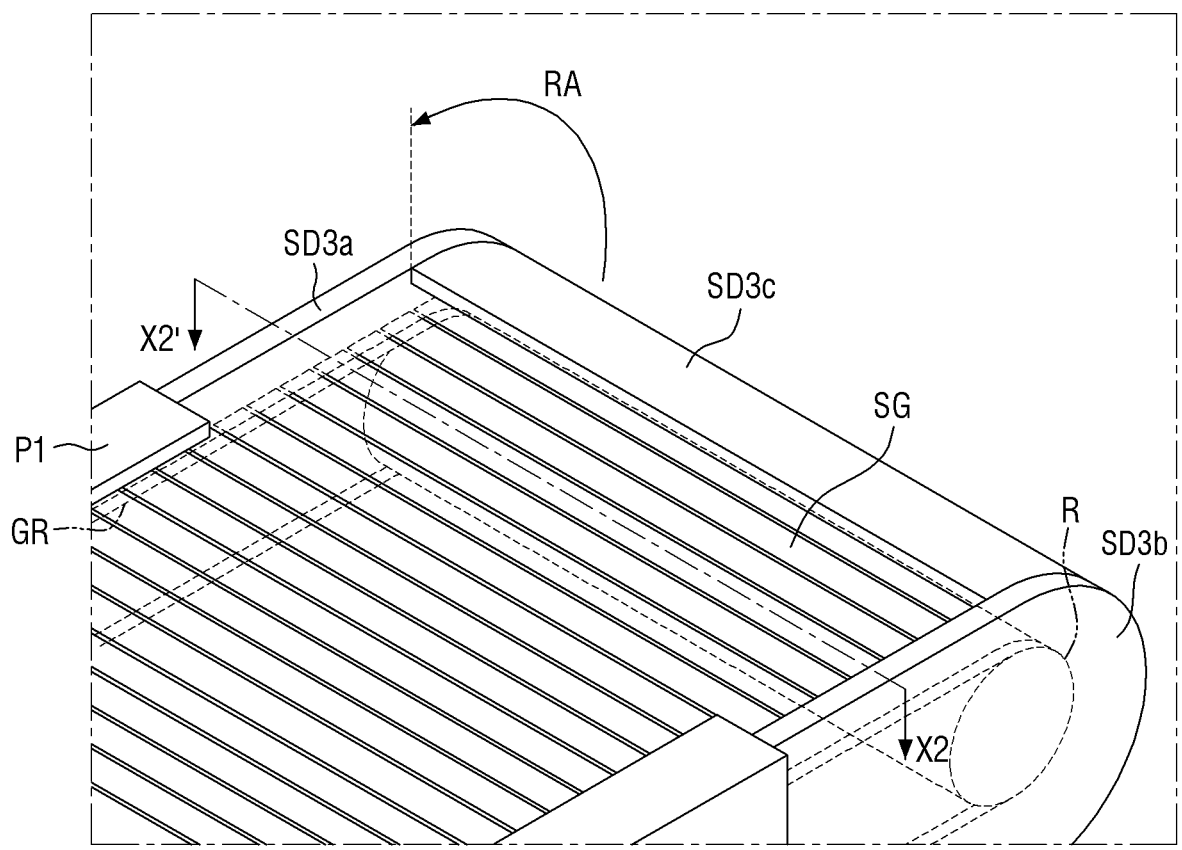
FIG. 10 is a schematic perspective view illustrating an arrangement relationship between the panel storage container and segment bodies of the display device according to an embodiment.
Figure 11:
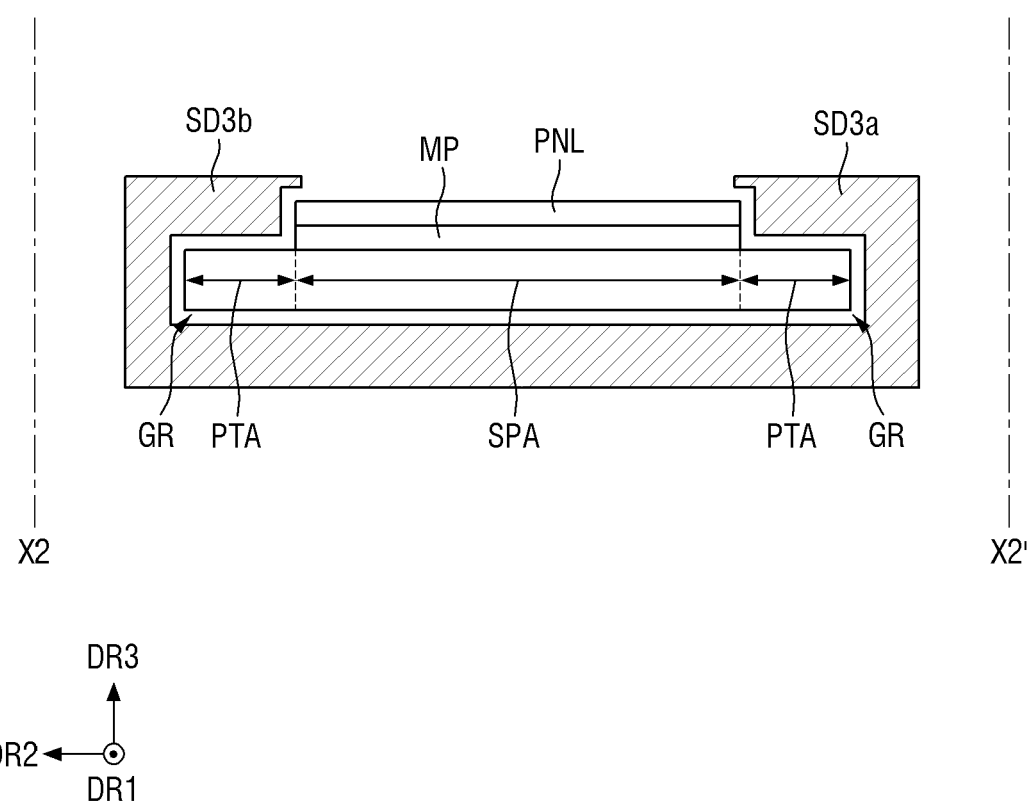
FIG. 11 is a schematic cross-sectional view illustrating a schematic cross section taken along line X2-X2' of FIG. 10.

FIG. 8 is a schematic perspective view illustrating a panel storage container of the display device according to an embodiment. FIG. 9 is an exploded perspective view illustrating the panel storage container of the display device according to an embodiment. FIG. 10 is a schematic perspective view illustrating an arrangement relationship between the panel storage container and segment bodies of the display device according to an embodiment. FIG. 11 is a schematic cross-sectional view illustrating a schematic cross section taken along line X2-X2' of FIG. 10.

Referring to FIGS. 8 to 11, the panel storage container SD of the display device 1 according to an embodiment may include a first storage container SD1, a second storage container SD2, a third storage container SD3, and a hinge HG.

Referring to FIG. 8 together with FIGS. 1 and 2, the hinge HG may be disposed between the first storage container SD1 and the second storage container SD2 to hinge-couple the first storage container SD1 and the second storage container SD2. Accordingly, the display device 1, which is a foldable display device, may be folded by the hinge so that the first storage container SD1 and the second storage container SD2 face each other.

Referring to FIG. 8 together with FIGS. 2 and 3, the third storage container SD3 may be slid from the first storage container SD1. For example, the third storage container SD3 may be engaged between fixing portions P1 and P2 formed in the first storage container SD1 to slide. A guide rail GR for guiding a sliding operation of the display panel PNL may be formed in the third storage container SD3.

An arrangement relationship between the first storage container SD1 and the third storage container SD3 will be described with reference to FIG. 9. The first storage container SD1 may include a first sidewall portion SD1a on the other side or another side in the second direction DR2 and a second sidewall portion SD1b on one side or a side in the second direction DR2, and an area exposing a portion of the display panel PNL may be formed between the first sidewall portion SD1a and the second sidewall portion SD1b. The fixing portions protruding in the second direction DR2, for example, in a direction toward the inside of the first storage container SD1 may be formed at ends on both sides of each of the first sidewall portion SD1a and the second sidewall portion SD1b in the third direction DR3. In other words, a first fixing portion P1 may be formed at an end on one side or a side of each of the first sidewall portion SD1a and the second sidewall portion SD1b in the third direction DR3, and a second fixing portion P2 may be formed at an end on the other side or another side of each of the first sidewall portion SD1a and the second sidewall portion SD1b in the third direction DR3. The first fixing portion P1 and the second fixing portion P2 may face each other in the third direction DR3. Accordingly, the third storage container SD3 may be engaged and slid in a space formed between the first fixing portion P1 and the second fixing portion P2.

Referring to FIG. 9, the third storage container SD3 may include slide portions on both sides in the second direction DR2. By way of example, the third storage container SD3 may include a first slide portion SD3a on the other side or another side in the second direction DR2 and a second slide portion SD3b on one side or a side in the second direction DR2. The slide portion may have a flat plate shape having a plane defined in the first direction DR1 and the third direction DR3. The slide portion may be engaged with the first fixing portion P1 and the second fixing portion P2 formed on each of the first sidewall portion SD1a and the second sidewall portion SD1b of the first storage container SD1 and may be slid in the first direction DR1.

Guide rails GR engaged with the protrusion areas PTA of the segment bodies SG of the panel support SP may be formed in the first slide portion SD3a and the second slide portion SD3b of the third storage container SD3. The guide rail GR may define a trajectory on which the display panel PNL is slid. As shown in FIG. 11, the guide rail GR, which is a groove dug into each of the first slide portion SD3a and the second slide portion SD3b, may be formed to be engaged with the protrusion area PTA of each of the segment bodies SG. The support area SPA of each of the segment bodies may overlap the support plate MP disposed thereon and the display panel PNL disposed on the support plate MP in the third direction DR3.

The third storage container SD3 may further include a cover portion SD3c connecting ends on the other side or another side of the first slide portion SD3a and the second slide portion SD3b in the first direction DR1. As illustrated in FIG. 10, a panel bending area RA in which the display panel PNL is bent may be formed in the cover portion SD3c.

In an embodiment, the guide rail GR may have a shape in which a U-shape or a substantially U-shape is rotated by about 90° counterclockwise. In other words, the guide rail GR may have a shape extending to one side or a side in the first direction DR1, bending to the other side or another side in the third direction DR3 in the panel bending area RA, and extending to the other side or another side in the first direction DR1 again. A hole H for disposing a roll R, which will be described later, may be formed in one area or an area of the slide portion in which a section in which the guide rail GR is bent is formed.

The panel storage container SD may further include a roll R. The roll R may serve to assist the slide behavior of the display panel PNL. The roll R may have a cylindrical shape or a substantially cylindrical shape having a cross section of a circle, or substantially a circle. The roll R may be inserted into and fixed to the hole H formed in the slide portion, and may rotate according to the slide behavior of the display panel PNL.

Figure 12:
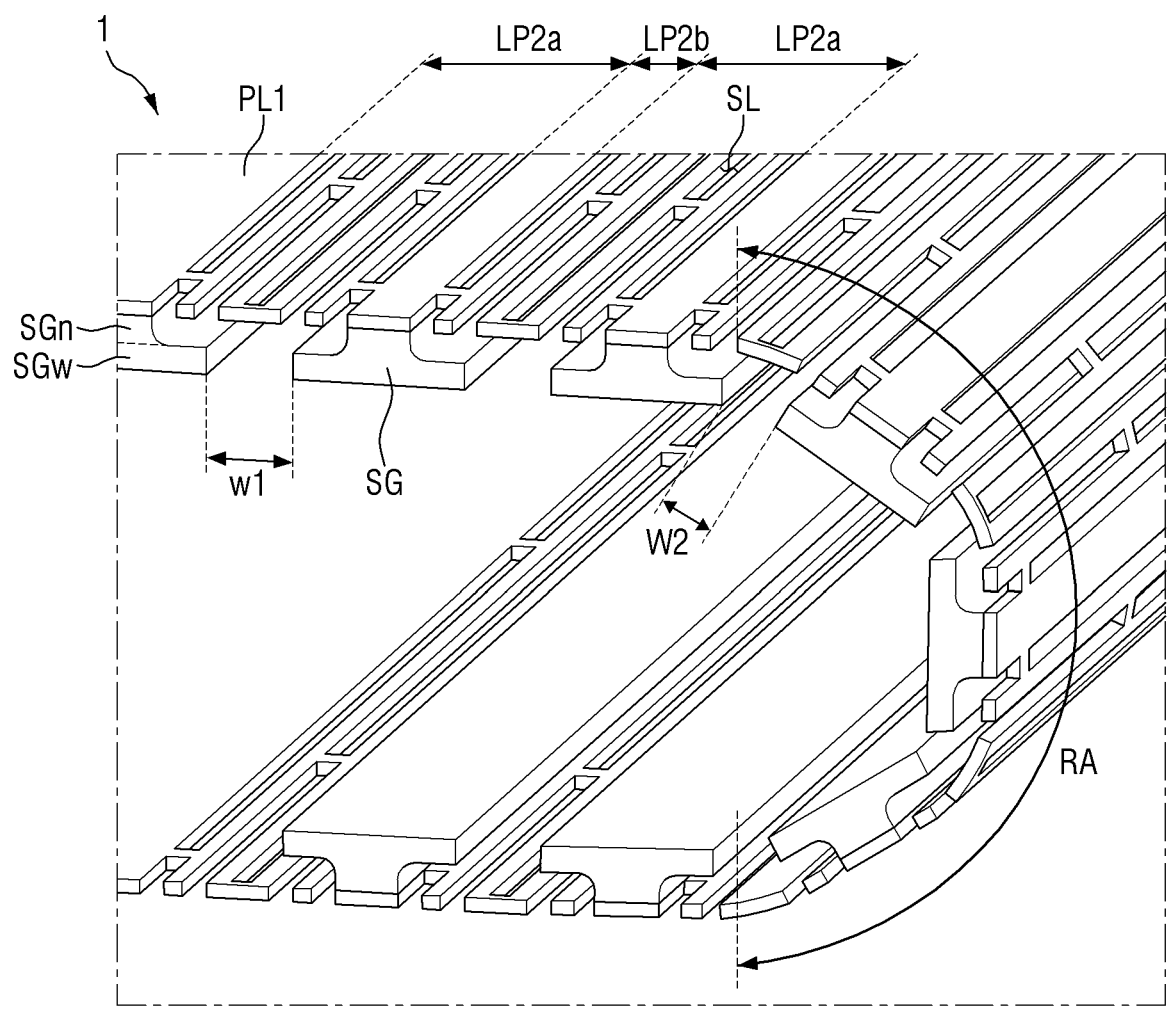
FIG. 12 is a schematic perspective view illustrating a change in a distance between the segment bodies in a panel bending area of the display device according to an embodiment.
Figure 13:
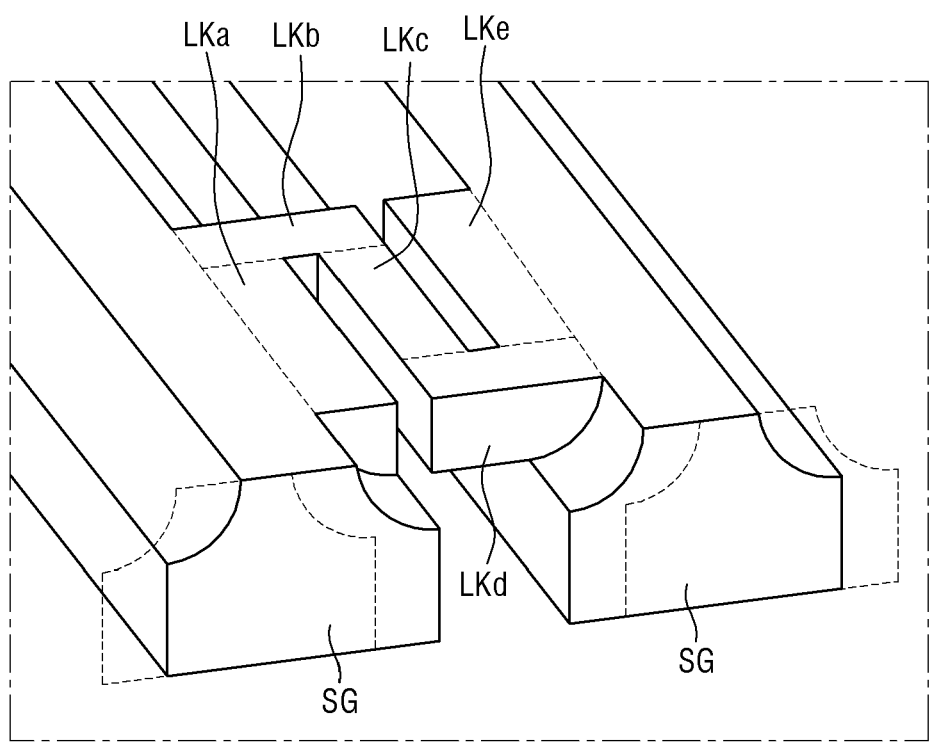
FIG. 13 is a schematic perspective view illustrating adjacent segment bodies of the display device and a connection portion therebetween according to an embodiment.

FIG. 12 is a schematic perspective view illustrating a change in a distance between the segment bodies in a panel bending area of the display device according to an embodiment. FIG. 13 is a schematic perspective view illustrating adjacent segment bodies of the display device and a connection portion therebetween according to an embodiment.

In FIG. 12, the above-described roll R, panel storage container SD, and connection portion LK are omitted in order to explain a change in a distance between the segment bodies SG.

Referring to FIG. 12 together with FIGS. 8 to 11, since the segment bodies SG are engaged with the guide rail GR, the segment bodies SG may be arranged or disposed along the guide rail GR bent at the panel bending area RA, and accordingly, the support plate MP and the display panel PNL disposed on the segment bodies SG may also be bent at the panel bending area RA. The distance between the adjacent segment bodies SG may have a first width w1 in an area other than the panel bending area RA, but may have a second width W2 smaller than the first width w1 in the panel bending area RA. In other words, the distance between the adjacent segment bodies SG may be different in the panel bending area RA and the area other than the panel bending area RA.

However, in case that the distance between the adjacent segment bodies SG becomes narrower than necessary in the panel bending area RA, a stress may be applied between the support plate MP and the attachment portion SGn of the segment body SG, so that the segment body SG may be separated from the support plate MP. Accordingly, it is necessary to prevent the separation of the segment bodies SG by maintaining the distance between the segment bodies SG to some extent even in the panel bending area RA.

Referring to FIG. 13, the connection portion LK of the display device 1 according to an embodiment may be disposed between the adjacent segment bodies SG and be integral with each of the segment bodies SG to maintain the distance between the segment bodies SG to some extent even in the panel bending area RA.

The connection portion of the display device 1 according to an embodiment may have an N-shape or a substantially N-shape as a shape bent at least once or more in plan view. For example, in case that the segment body SG disposed on one side or a side in the first direction DR1 among the segment bodies SG illustrated in FIG. 13 is referred to as a "first segment body", and the segment body SG disposed on the other side or another side in the first direction DR1 is referred to as a "second segment body", the connection portion LK disposed between the first segment body and the second segment body may include a first portion LKa integral with the first segment body and extending in the second direction DR2, a second portion LKb disposed on the other side or another side of the first portion LKa in the second direction DR2 and extending in the first direction DR1, a third portion LKc disposed on the other side or another side of the second portion LKb in the first direction DR1, extending in the second direction DR2, and spaced apart from the first portion LKa in the first direction DR1, a fourth portion LKd disposed on one side or a side of the third portion LKc in the second direction DR2 and extending toward the second segment body in the first direction DR1, and a fifth portion LKe disposed on the other side or another side of the fourth portion LKd in the first direction DR1, integral with the second segment body, extending in the second direction DR2, and spaced apart from the third portion LKc.

In case that the distance between the adjacent segment bodies SG is narrowed, the connection portion LK may be deformed so that one side or a side of the first portion LKa and one side or a side of the third portion LKc of the connection portion LK in the first direction DR1 approach to each other and the other side or another side of the fifth portion LKe and the other side or another side of the third portion LKc thereof in the first direction DR1 approach to each other, thereby having a restoring force, for example, an elastic force. Accordingly, even if the distance between the segment bodies SG is narrowed in the panel bending area RA as described above, the distance between the segment bodies SG is secured by the elasticity of the connection portion LK, so that the above-described separation of the segment body SG may be prevented.

The connection portion LK may prevent the segment bodies SG from being deformed as the display panel PNL is bent in the panel bending area RA. For example, the display panel PNL may be bent in the panel bending area RA, and the segment bodies SG supporting the bent area of the display panel PNL may have their own shape deformed, such as twisted, rotated, compressed, or stretched according to the bending of the display panel PNL. The connection portion LK fixes both ends of the segment bodies SG supporting the bent area of the display panel PNL in the panel bending area RA, and thus prevents the deformation of the segment bodies SG as described above.

In an embodiment, the connection portion LK may be integral with the segment bodies SG. For example, the connection portion LK may be integral with the segment bodies SG without a separate adhesive member and may include a same material (for example, a metal material such as SUS304). Accordingly, the connection portion LK may be formed through a same manufacturing process as the segment bodies SG without performing a separate manufacturing process.

Hereinafter, other embodiments of the display device 1 according to an embodiment will be described. In the following embodiments, the same components as those of the above-described embodiment will be denoted by the same reference numerals, and an overlapping description thereof may be omitted or simplified and differences will be described.

Figure 14:
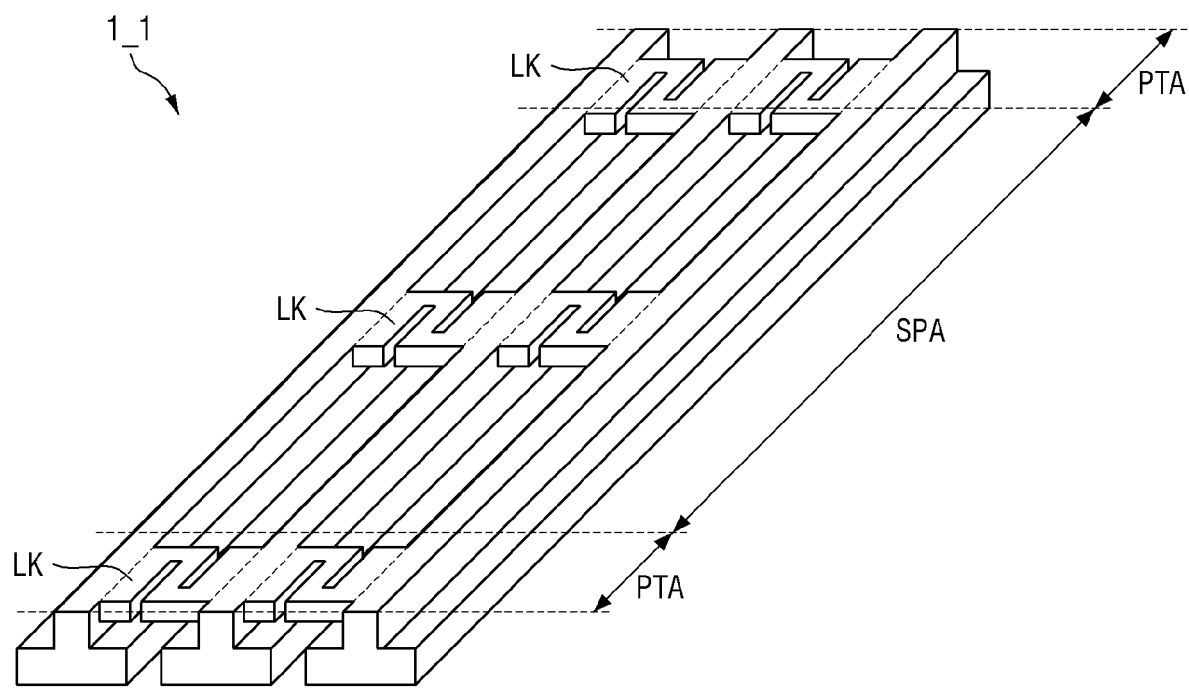
FIG. 14 is a schematic perspective view illustrating a structure of a segment body of a display device according to an embodiment.

FIG. 14 is a schematic perspective view illustrating a structure of a segment body of a display device according to an embodiment.

Referring to FIG. 14, it is illustrated that connection portions LK may be additionally disposed in the support area SPA as well as the protrusion area PTA between adjacent segment bodies SG of a display device 1_1 according to an embodiment. Although it is illustrated in FIG. 14 that three connection portions LK are disposed between the adjacent segment bodies SG, the number of the disposed connection portions LK is not limited thereto.

By the above-described configuration, the separation of the segment body SG from the support plate MP may be stably prevented.

Figure 15:
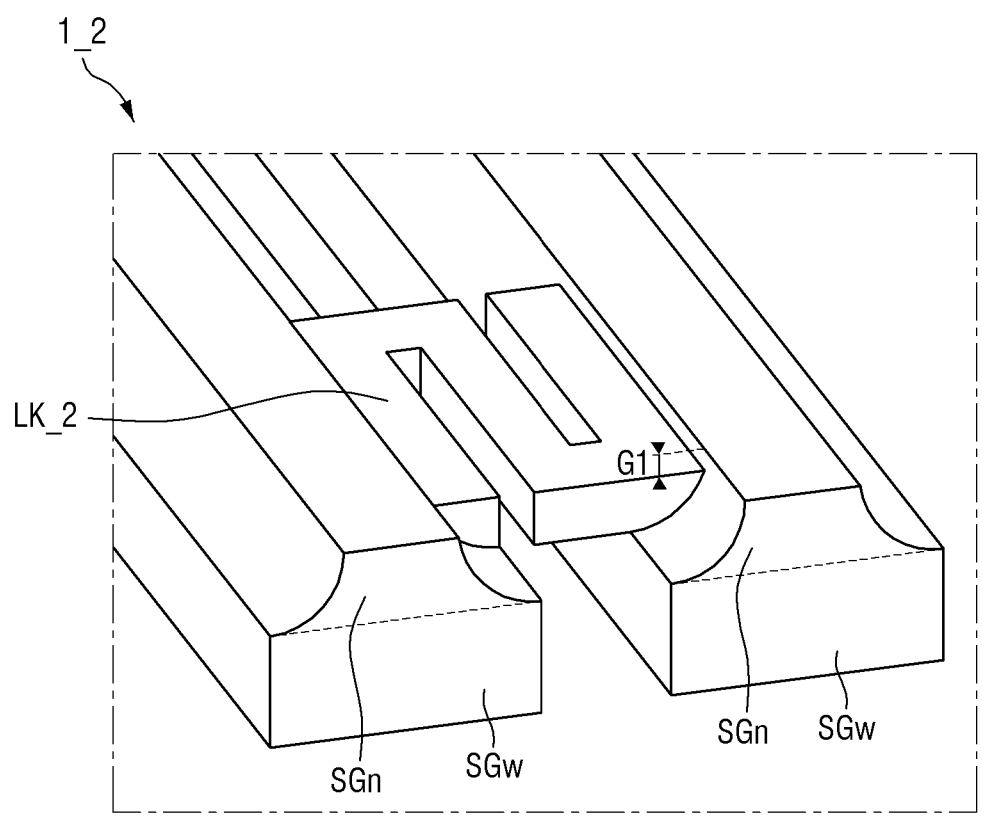
FIG. 15 is a schematic perspective view illustrating adjacent segment bodies of a display device and a connection portion therebetween according to an embodiment.
Figure 15:
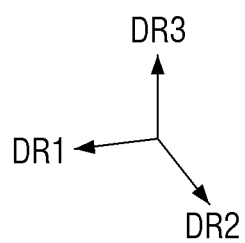

FIG. 15 is a schematic perspective view illustrating adjacent segment bodies of a display device and a connection portion therebetween according to an embodiment.

Referring to FIG. 15, it is illustrated that a connection portion LK_2 of a display device 1_2 according to an embodiment may form a step difference with the attachment portion SGn of the segment body SG. For example, a top surface of the connection portion LK_2 may be disposed below a top surface of the attachment portion SGn to form a step difference of a first width G1.

Since the connection portion LK is not in direct contact with the guide rail GR (FIGS. 10 and 11) of the third storage container SD3 (FIGS. 10 and 11) by the configuration as described above, damage caused by friction with the guide rail GR may be prevented.

Figure 16:
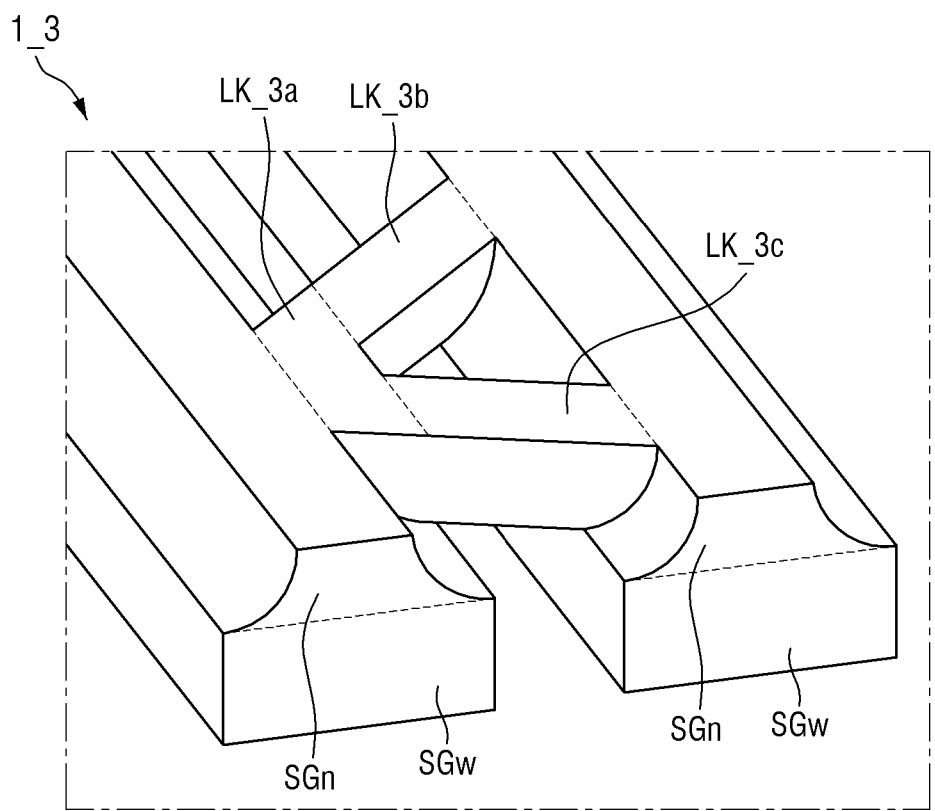
FIG. 16 is a schematic perspective view illustrating adjacent segment bodies of a display device and a connection portion therebetween according to an embodiment.
Figure 16:
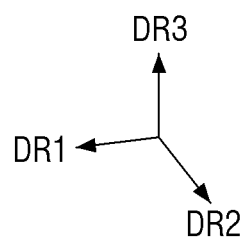

FIG. 16 is a schematic perspective view illustrating adjacent segment bodies of a display device and a connection portion therebetween according to an embodiment.

Referring to FIG. 16, it is illustrated that a connection portion LK_3 of a display device 1_3 according to an embodiment may have a 'V' shape or a substantially 'V' shape in plan view. For example, the connection portion LK_3 may include a first portion LK_3a integral with the first segment body and extending in the second direction DR2, a second portion LK_3b disposed on the other side or another side of the first portion LK_3a in the second direction DR2 and extending obliquely to the second segment body, and a third portion LK_3c disposed on one side or a side of the first portion LK_3a in the second direction DR2 and extending obliquely to the second segment body.

In case that the distance between the first segment body and the second segment body is narrowed, the connection portion LK_3 may be deformed so that the second portion LK_3b and the third portion LK_3c are spaced apart from each other, and may have an elastic force, and accordingly, the distance between the adjacent segment bodies SG may be maintained.

Figure 17:
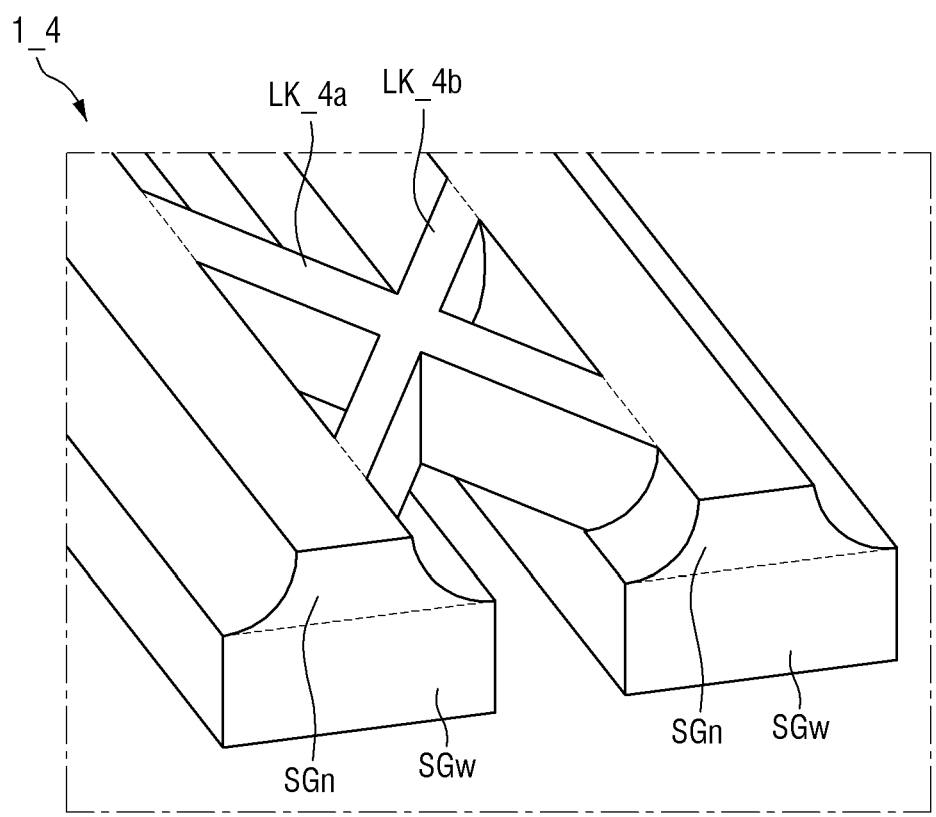
FIG. 17 is a schematic perspective view illustrating adjacent segment bodies of a display device and a connection portion therebetween according to an embodiment.
Figure 17:
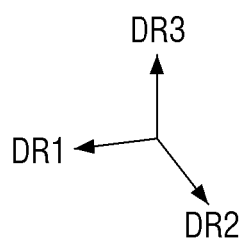

FIG. 17 is a schematic perspective view illustrating adjacent segment bodies of a display device and a connection portion therebetween according to an embodiment.

Referring to FIG. 17, it is illustrated that a connection portion LK_4 of a display device 1_4 according to an embodiment may have an 'X' shape or substantially 'X' shape in plan view. For example, the connection portion LK_4 may include a first portion LK_4a extending in a first oblique direction as a direction between one side or a side in the first direction DR1 and the other side or another side in the second direction DR2, and a second portion LK_4b extending in a second oblique direction intersecting the first oblique direction as a direction between one side or a side in the first direction DR1 and one side or a side in the second direction DR2. The first portion LK_4a and the second portion LK_4b may share a portion that the first portion LK_4a and the second portion LK_4b intersect each other.

In case that the distance between the first segment body and the second segment body is narrowed, the connection portion LK_4 may be deformed so that the first portion LK_4a and the second portion LK_4b are spaced apart from each other, and may have an elastic force, and accordingly, the distance between the adjacent segment bodies SG may be maintained.

Figure 18:
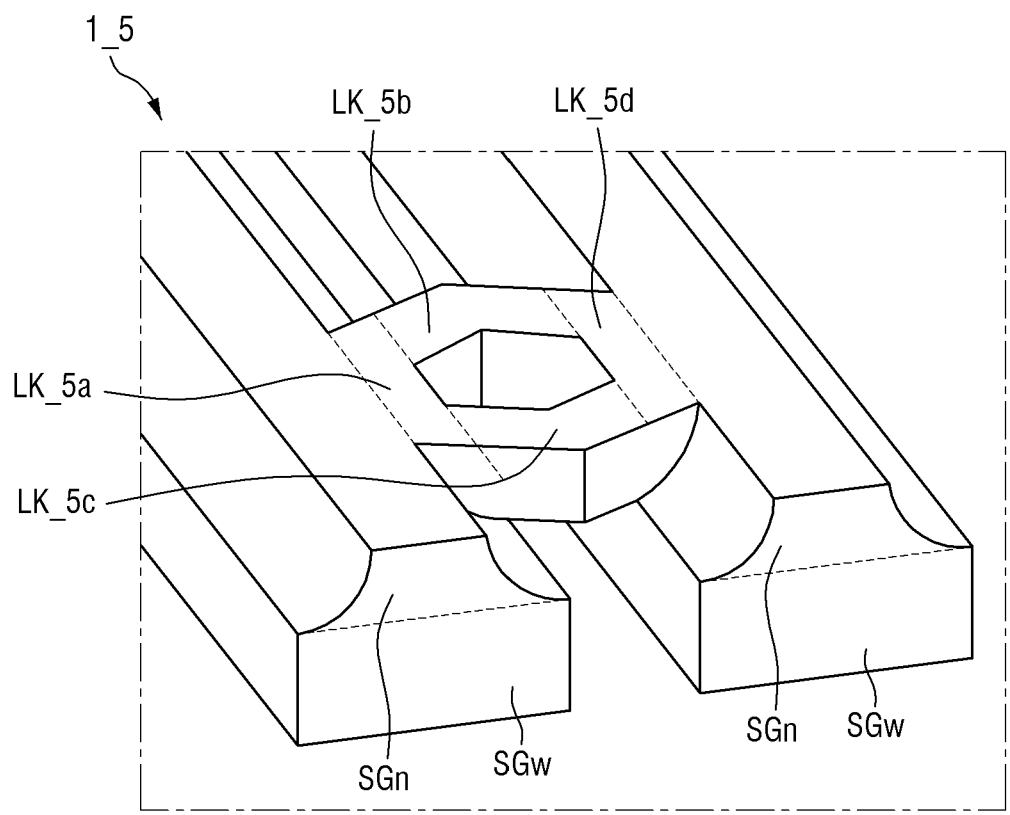
FIG. 18 is a schematic perspective view illustrating adjacent segment bodies of a display device and a connection portion therebetween according to an embodiment.
Figure 18:
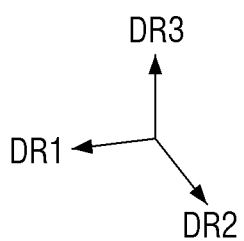

FIG. 18 is a schematic perspective view illustrating adjacent segment bodies of a display device and a connection portion therebetween according to an embodiment.

Referring to FIG. 18, it is illustrated that a connection portion LK_5 of a display device 1_5 according to an embodiment may have a rhombus shape or a substantially rhombus shape in plan view. For example, the connection portion LK_5 may include a first portion LK_5a integral with the first segment body and extending in the second direction DR2, a second portion LK_5b disposed on the other side or another side of the first portion LK_5a in the second direction DR2 and bent in a shape of an inequality sign (<) spread toward one side or a side in the second direction DR2, a third portion LK_5c disposed on one side or a side of the first portion LK_5a in the second direction DR2 and bent in a shape of an inequality sign (>) spread toward the other side or another side in the second direction DR2, and a fourth part LK_5d connecting the other side or another side of the second portion LK_5b in the first direction DR1 and the other side or another side of the third portion LK_5c in the first direction DR1, integral with the second segment body, and extending in the second direction DR2.

In case that the distance between the first segment body and the second segment body is narrowed, the connection portion LK_5 may be deformed so that the second portion LK_5b and the third portion LK_5c are more severely bent, and may have an elastic force, and accordingly, the distance between the adjacent segment bodies SG may be maintained.

Figure 19:
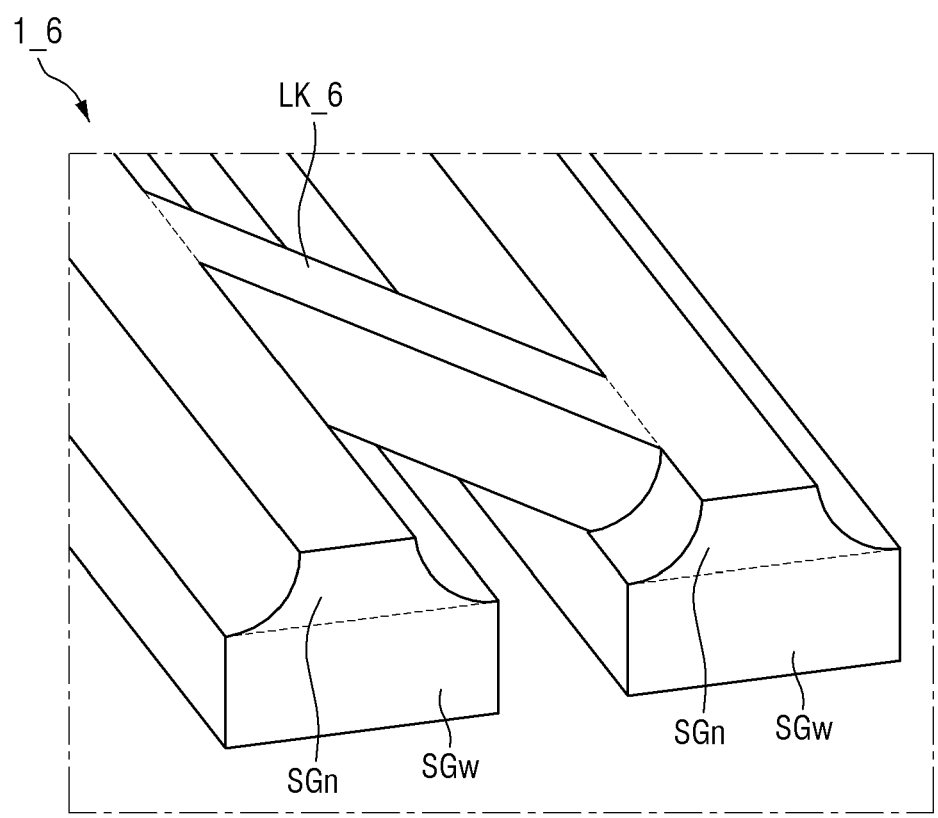
FIG. 19 is a schematic perspective view illustrating adjacent segment bodies of a display device and a connection portion therebetween according to an embodiment.
Figure 19:
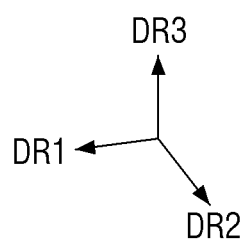

FIG. 19 is a schematic perspective view illustrating adjacent segment bodies of a display device and a connection portion therebetween according to an embodiment.

Referring to FIG. 19, it is illustrated that a connection portion LK_6 of a display device 1_6 according to an embodiment may have a shape extending in an oblique line. For example, the connection portion LK_6 extends while having an oblique direction between the other side or another side in the first direction DR1 and one side or a side in the second direction DR2, so that a portion connected to the first segment body and a portion connected to the second segment body may not overlap in the first direction DR1.

In case that the distance between the first segment body and the second segment body is narrowed, the connection portion LK_6 may be deformed to have an elastic force, and accordingly, the distance between the adjacent segment bodies SG may be maintained.

Figure 20:
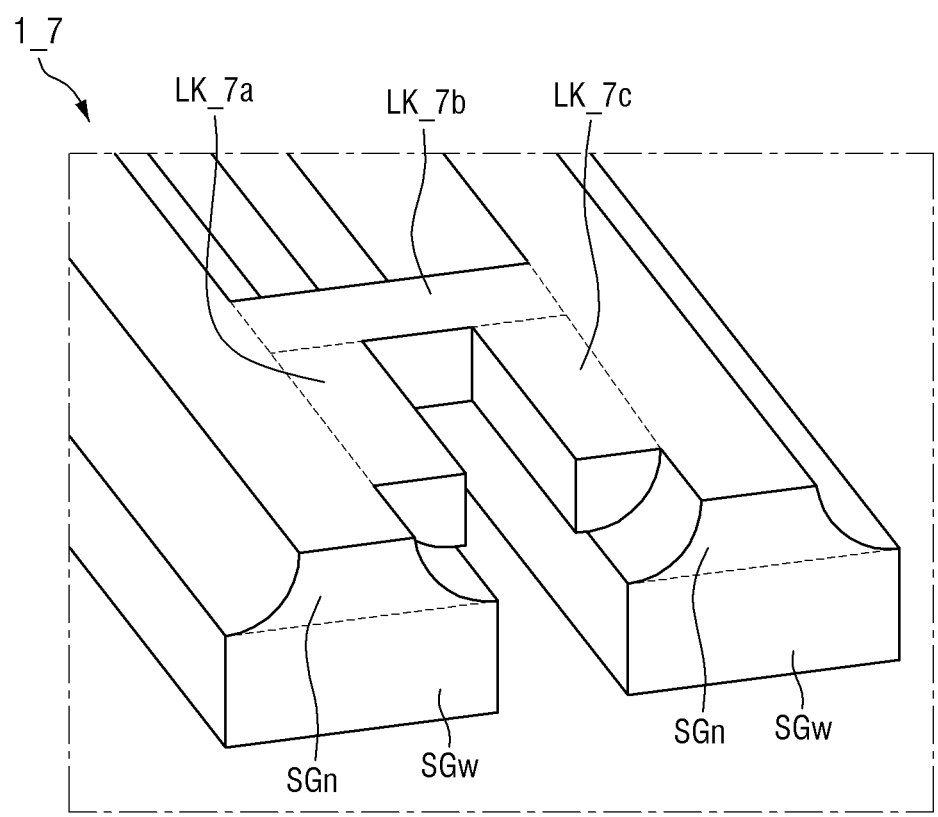
FIG. 20 is a schematic perspective view illustrating adjacent segment bodies of a display device and a connection portion therebetween according to an embodiment.
Figure 20:
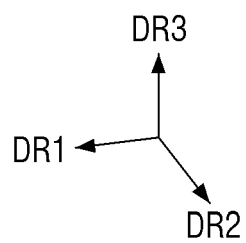

FIG. 20 is a schematic perspective view illustrating adjacent segment bodies of a display device and a connection portion therebetween according to an embodiment.

Referring to FIG. 20, it is illustrated that a connection portion LK_7 of a display device 1_7 according to an embodiment may be bent a 'U' shape or a substantially 'U' shape in plan view. For example, the connection portion LK_7 may include a first portion LK_7a integral with the first segment body and extending in the second direction DR2, a second portion LK_7b disposed on the other side or another side of the first portion LK_7a in the second direction DR2 and extending in the first direction DR1, and a third portion LK_7c disposed on the other side or another side of the second portion LK_7b in the first direction DR1, integral with the second segment body, and extending in the second direction DR2.

In case that the distance between the first segment body and the second segment body is narrowed, the connection portion LK_7 may be deformed so that the first portion LK_7a and the second portion LK_7b are adjacent to each other, and may have an elastic force, and accordingly, the distance between the adjacent segment bodies SG may be maintained.

Figure 21:
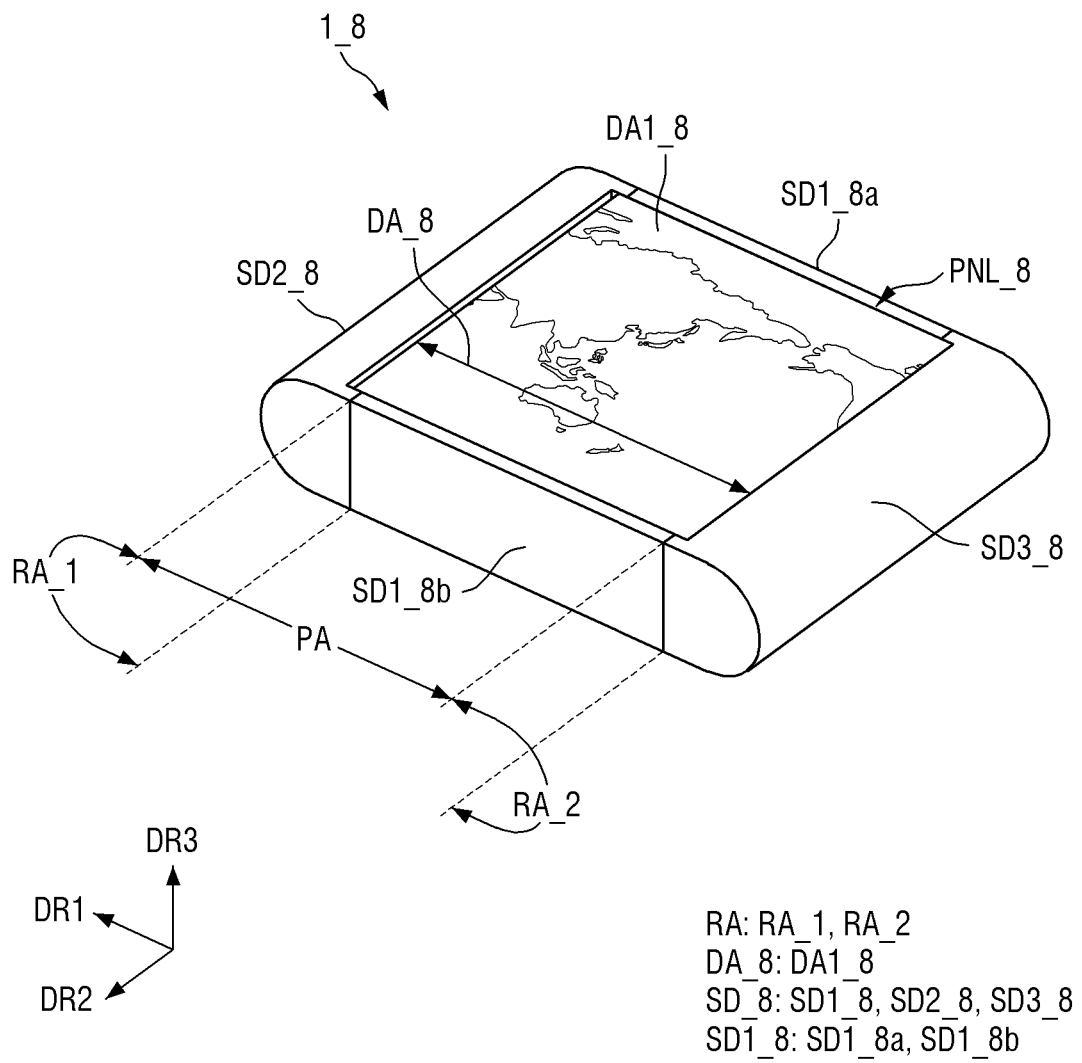
FIG. 21 is a schematic perspective view illustrating a display device according to an embodiment.
Figure 22:
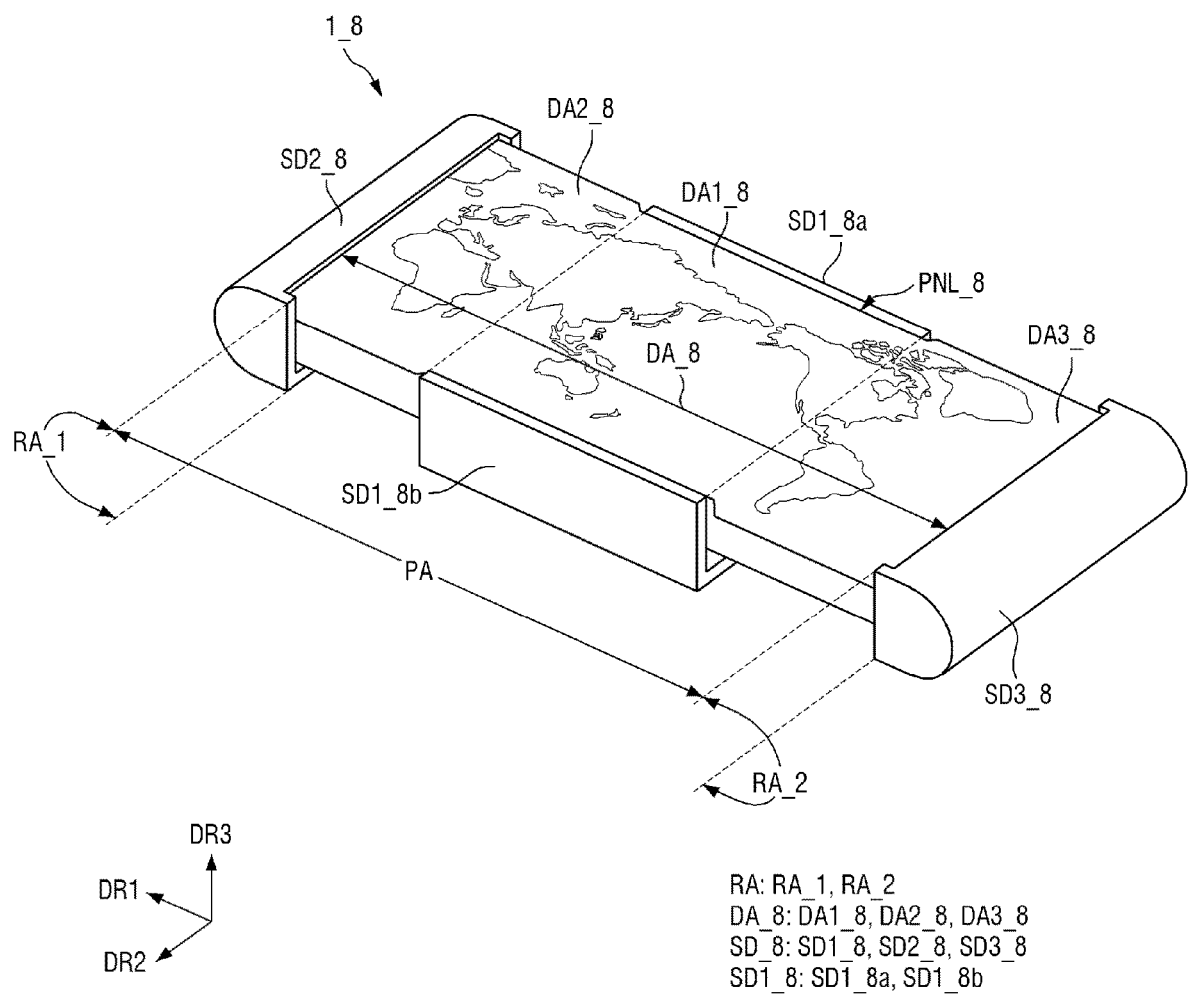
FIG. 22 is a schematic perspective view illustrating an enlarged state of the display device according to an embodiment of FIG. 21.
Figure 23:
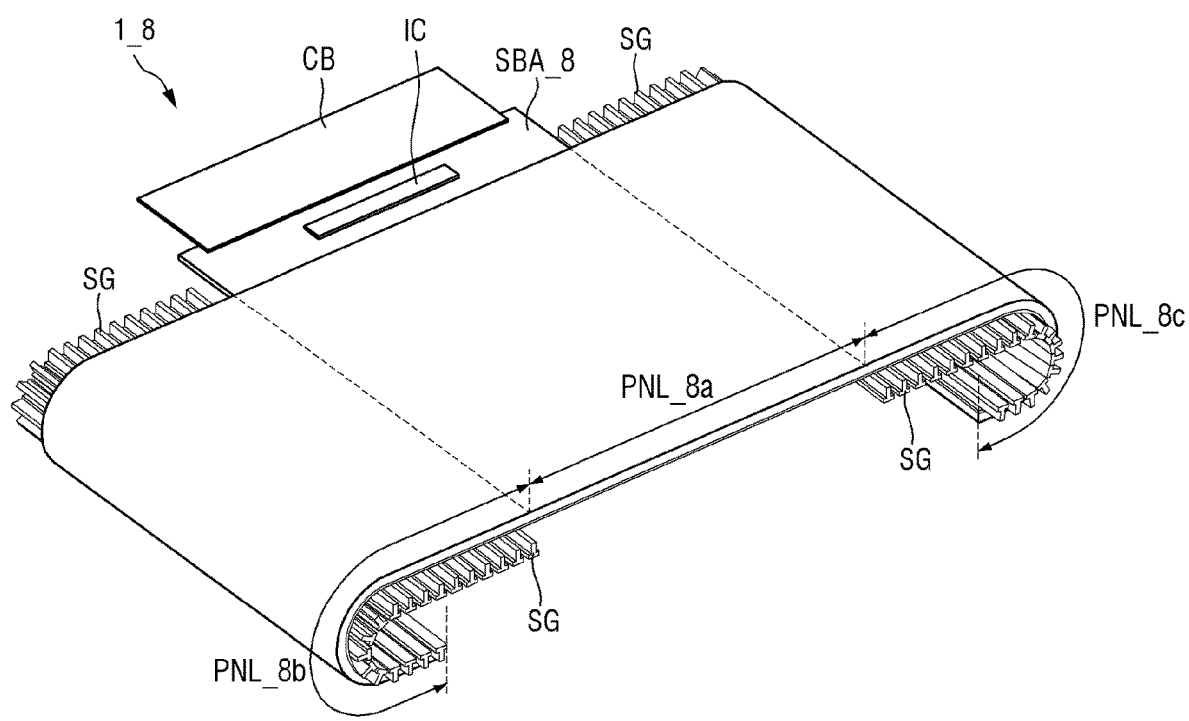
FIG. 23 is a schematic perspective view illustrating an arrangement relationship between a display panel and a panel support of the display device according to an embodiment of FIG. 21.
Figure 23:
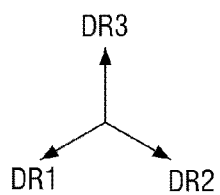
Figure 24:
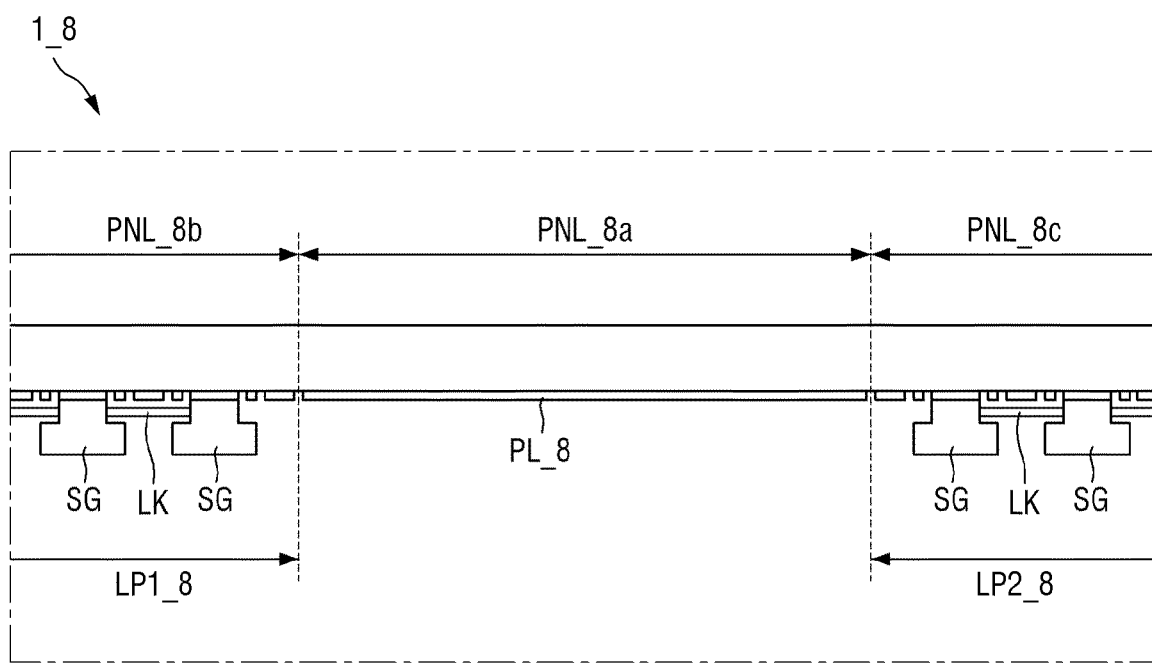
FIG. 24 is a side view illustrating the arrangement relationship between the display panel and the panel support of the display device according to an embodiment of FIG. 21.
Figure 24:
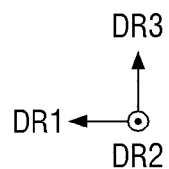

FIG. 21 is a schematic perspective view illustrating a display device according to an embodiment. FIG. 22 is a schematic perspective view illustrating an enlarged state of the display device according to an embodiment of FIG. 21. FIG. 23 is a schematic perspective view illustrating an arrangement relationship between a display panel and a panel support of the display device according to an embodiment of FIG. 21. FIG. 24 is a side view illustrating the arrangement relationship between the display panel and the panel support of the display device according to an embodiment of FIG. 21.

Referring to FIGS. 21 to 24, it is illustrated that a display device 1_8 according to an embodiment may be a multi-slidable display device that slides in both directions.

The display device 1_8 according to an embodiment may include a panel planarization area PA in which the display panel PNL_8 is flatly disposed and a panel bending area RA in which the display panel PNL_8 is disposed in a bent state.

The panel planarization area PA of the display device 1_8 substantially overlaps an area exposing a display panel PNL_8 of a panel storage container SD_8. The panel bending area RA of the display device 1_8 may be formed inside the panel storage container SD. The panel bending area RA may be bent with a selectable radius of curvature, and may be an area in which the display panel PNL_8 is bent according to the radius of curvature. The panel bending area RA may be disposed on both sides of the panel planarization area PA in the first direction DR1. For example, a first panel bending area RA_1 may be disposed on one side or a side of the panel planarization area PA in the first direction DR1, and a second panel bending area RA_2 may be disposed on the other side or another side of the panel planarization area PA in the first direction DR1. The first panel bending area RA_1 may be an area in which a second area PNL_8b of the display panel PNL_8, which will be described later, is bent. The second panel bending area RA_2 may be an area in which a third area PNL_8c of the display panel PNL_8, which will be described later, is bent.

As the display device 1_8 expands, an area of the panel planarization area PA may increase as illustrated in FIG. 22. Accordingly, a distance between the first panel bending area RA_1 and the second panel bending area RA_2 may be increased.

The display panel PNL_8 may be a flexible panel. The display panel PNL_8 may have flexibility to be partially rolled, bent, or curved in the panel storage container SD_8 as will be described later. The display panel PNL_8 may slide in the first direction DR1.

The display panel PNL_8 may include a first area PNL_8a, and a second area PNL_8b and a third area PNL_8c disposed opposite to each other with the first area PNL_8a interposed therebetween. The first area PNL_8a of the display panel PNL_8 may be an always flat area capable of maintaining a flat shape regardless of a sliding operation. The second area PNL_8b and the third area PNL_8c of the display panel PNL_8 may be rolled, bent, or curved, or may be a bent area or a bendable area in which the rolled, bent, or curved shape and the flat shape are exchanged according to a sliding operation.

A display area DA_8 of the display panel PNL_8 may be divided into a first display area DA1_8, a second display area DA2_8, and a third display area DA3_8 depending on whether or not the display panel PNL_8 slides and the degree of sliding of the display panel PNL_8. The presence or absence of the second display area DA2_8 and the third display area DA3_8 and the area thereof may vary depending on whether or not the display panel PNL_8 slides and the degree of sliding of the display panel PNL_8. By way of example, in a non-sliding state (hereinafter, referred to as a "first state"), the display panel PNL_8 has the first display area DA1_8 having a first area. In a sliding state (hereinafter, referred to as a "second state"), the display area DA_8 may further include the second display area DA2_8 and the third display area DA3_8 that are expanded, in addition to the first display area DA1_8.

The second display area DA2_8 may be an area in which the second area PNL_8b of the display panel PNL_8 and the panel planarization area PA overlap, and the third display area DA3_8 may be an area in which the third area PNL_8c of the display panel PNL_8 and the panel planarization area PA overlap.

The areas of the second display area DA2_8 and the third display area DA3_8 may vary according to the degree of sliding. For example, in case that the display device 1_8 is slid to the maximum, the second display area DA2_8 has a second area and the third display area DA3_8 has a third area, and the display area DA_8 has a fourth area that is the sum of the first area, the second area, and the third area. Here, the fourth area may be the maximum area that the display area DA_8 may have.

The first display area DA1_8 may overlap the first area PNL_8a of the display panel PNL_8. The second display area DA2_8 may overlap at least a portion of the second area PNL_8b of the display panel PNL_8. The third display area DA3_8 may overlap at least a portion of the third area PNL_8c of the display panel PNL_8. In an embodiment, a boundary between the first display area DA1_8 and the second display area DA2_8 may coincide with a boundary between the first area PNL_8a and the second area PNL_8b, and the boundary between the first display area DA1_8 and the second display area DA2_8 may coincide with a boundary between the first area PNL_8a and the third area PNL_8c, but is not limited thereto.

The display panel PNL_8 may further include a sub-area SBA_8. The sub-area SBA_8 may be disposed on the other side or another side of the first area PNL_8a of the display panel PNL_8 in the second direction DR2. The sub-area SBA_8 may be an area that is curved or bent. In case that the sub-area SBA_8 is bent, the sub-area SBA_8 may overlap the first area PNL_8a in the third direction DR3. The sub-area SBA_8 may have a quadrangular planar shape, but is not limited thereto. It is to be understood that the shapes disclosed herein may include shapes substantial to the shapes disclosed herein.

In an embodiment, a length of the sub-area SBA_8 in the first direction DR1 may be substantially the same as a length of the first area PNL_8a in the first direction DR1, but is not limited thereto. For example, the length of the sub-area SBA_8 in the first direction DR1 may also be smaller than the length of the first area PNL_8a in the first direction DR1.

A driving circuit IC and a circuit board CB may be disposed on one side surface or a side surface of the sub-area SBA_8 in the third direction DR3. Since the description of the driving circuit IC and the circuit board CB is the same as described above, a detailed description thereof may be omitted.

A bottom surface of the display panel PNL_8 may be supported by a panel support SP_8. For example, the panel support SP_8 may include a support plate MP_8 entirely supporting the bottom surface of the display panel PNL_8, and segment bodies SG supporting the second area PNL_8b and the third area PNL_8c of the display panel PNL_8.

The support plate MP_8 may include a plate portion PL_8 overlapping the first area PNL_8a of the display panel PNL_8. The plate portion PL_8 may have a flat plate shape formed by a plane formed by the first direction DR1 and the second direction DR2.

The support plate MP_8 may include a grid pattern in which slits penetrating through the support plate MP_8 are formed in a portion overlapping the second area PNL_8b and the third area PNL_8c of the display panel PNL_8. For example, the support plate MP_8 may include a first grid pattern portion LP1_8 overlapping the second area PNL_8b of the display panel PNL_8, and a second grid pattern portion LP2_8 overlapping the third area PNL_8c thereof.

The segment bodies SG may be attached to lower sides of the first grid pattern portion LP1_8 and the second grid pattern portion LP2_8. The segment bodies SG may protrude to both sides of the display panel PNL_8 in the second direction DR2, and similarly as described above, the protruding portions of the segment bodies SG may be connected through the connection portion LK.

Since the first grid pattern portion LP1_8 and the second grid pattern portion LP2_8 according to an embodiment are substantially the same as the second grid pattern portion LP2 of the display device 1 according to an embodiment, the segment body SG according to an embodiment is substantially the same as the segment body SG of the display device 1 according to an embodiment, and the connection portion LK according to an embodiment is substantially the same as the connection portion LK of the display device 1 according to an embodiment, a detailed description thereof may be omitted.

As illustrated in FIGS. 21 and 22, the panel storage container SD_8 may serve to store at least a portion of the display panel PNL_8 and assist a sliding operation of the display device 1_8. The panel storage container SD_8 may include a first storage container SD1_8 positioned at the center of the display device 1_8, a second storage container SD2_8 disposed on one side or a side of the first storage container SD1_8 in the first direction DR1 and including a first panel bending area RA_1, and a third storage container SD3_8 disposed on one side or a side of the first storage container SD1_8 in the first direction DR1 and including a second panel bending area RA_2. The first storage container SD1_8 may connect the second storage container SD2_8 and the third storage container SD3_8 to each other. Rails may be formed inside the second storage container SD2_8 and the third storage container SD3_8 to guide the sliding operation of the display panel PNL_8.

By way of example, referring to FIGS. 21 and 22, the first storage container SD1_8 may include a first sidewall portion SD1_8a on the other side or another side in the second direction DR2 and a second sidewall portion SD1_8b on the one side or a side in the second direction DR2. An area exposing a portion of the display panel PNL_8 may be formed between the first sidewall portion SD1_8a and the second sidewall portion SD1_8b. Fixing portions protruding in the second direction DR2, for example, in a direction toward the inside of the first storage container SD1_8 may be formed at ends on both sides of each of the first sidewall portion SD1_8a and the second sidewall portion SD1_8b in the third direction DR3. Accordingly, similarly as described above, the third storage container SD3_8 may be engaged and slid in a space formed between the fixing portions. Since the second storage container SD2_8 and the third storage container SD3_8 according to an embodiment are substantially the same as the third storage container SD3 according to an embodiment, a detailed description thereof may be omitted.

With the configuration as described above, the display device 1_8 according to an embodiment may slide in both directions.

Figure 25:
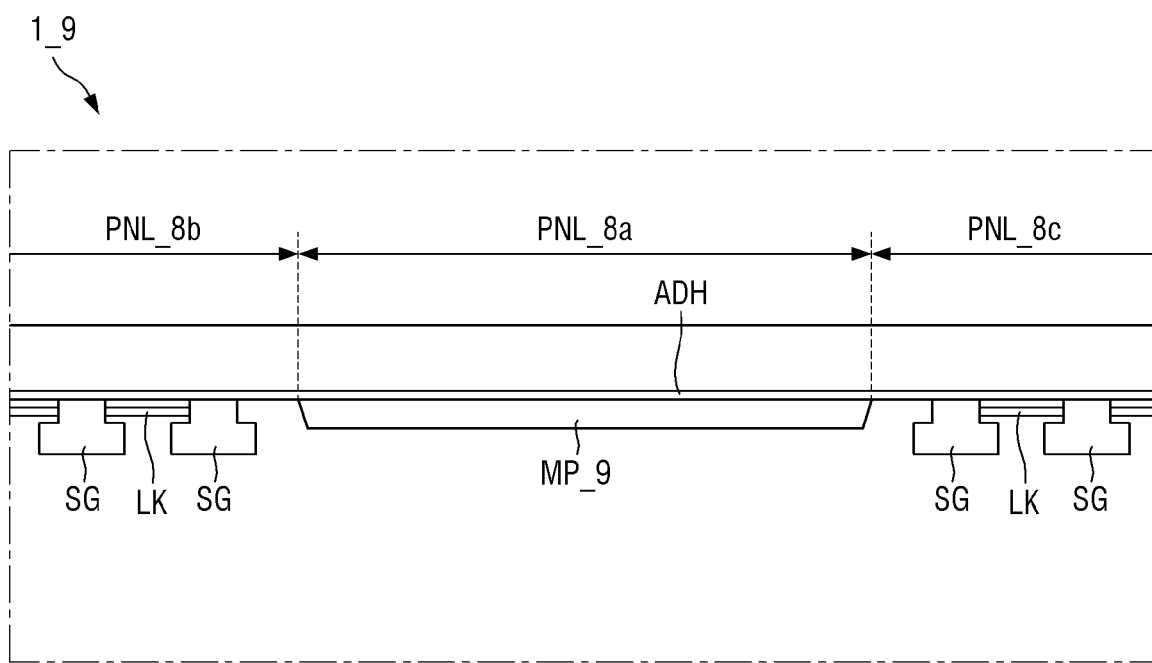
FIG. 25 is a side view illustrating an arrangement relationship between a display panel and a panel support of a display device according to an embodiment.
Figure 25:

FIG. 25 is a side view illustrating an arrangement relationship between a display panel and a panel support of a display device according to an embodiment.

Referring to FIG. 25, a display device 1_9 according to an embodiment may be different from the display device 1_8 according to an embodiment of FIG. 21 in that a panel support SP_9 of the display device 1_9 may include a support plate MP_9 disposed only on a bottom surface of the first area PNL_8a of the display panel PNL_8, and other configurations are substantially the same or similar.

The panel support SP_9 according to an embodiment may be attached to the bottom surface of the display panel PNL_8 through an adhesive member ADH. The panel support SP_9 may include a support plate MP_9 and segment bodies SG.

The support plate MP_9 may be disposed only on the bottom surface of the first area PNL_8a of the display panel PNL_8 and may not be disposed on the second area PNL_8b and the third area PNL_8c. Accordingly, the segment bodies SG may be attached to the bottom surfaces of the second area PNL_8b and the third area PNL_8c through the adhesive member ADH.

With the above-described configuration, the display device 1_9 according to an embodiment may be manufactured more simply.

In concluding the detailed description, those skilled in the art will appreciate that many variations and modifications can be made to the disclosed embodiments without substantially departing from the principles of the disclosure. Therefore, the disclosed embodiments are used in a generic and descriptive sense only and not for purposes of limitation.

What is claimed is:

1. A display device comprising:
a display panel including a first active area and a second active area disposed on a side of the first active area in a first direction;
a support plate supporting a bottom surface of the display panel, the support plate including:
a first plate portion overlapping the first active area in plan view; and
a first grid pattern portion overlapping the second active area in plan view and having slits penetrating through the support plate; and
segment bodies disposed on a bottom surface of the first grid pattern portion of the support plate, extending in a second direction intersecting the first direction, and spaced apart from each other in the first direction,
wherein the segment bodies include a first segment body and a second segment body adjacent to the first segment body,
wherein at least a portion of the first segment body and at least a portion of the second segment body are connected through a first connection portion bridging the slits of the support plate disposed between the at least a portion of the first segment body and the at least a portion of the second segment body,
wherein the second active area is rollable about a roll axis extending in a direction intersecting the first direction and the roll axis is slidable in a different direction intersecting the second direction.

2. The display device of claim 1,
wherein the first active area includes at least one of a fixed portion or a foldable portion,
wherein the direction intersecting the first direction is the second direction,
wherein the direction intersecting the second direction is the first direction,
wherein each of the first segment body and the second segment body includes a protrusion area protruding from the first grid pattern portion of the support plate in the second direction,
wherein the first connection portion integrally connects the protrusion area of the first segment body and the protrusion area of the second segment body.

3. The display device of claim 2,
wherein the first active area includes the at least one foldable portion,
wherein the second active area extends to at least two outer corners of the display panel,
wherein each of the first segment body and the second segment body includes a support area overlapping the first grid pattern portion of the support plate in plan view,
wherein the support area of the first segment body and the support area of the second segment body are integrally connected through a second connection portion disposed between the support area of the first segment body and the support area of the second segment body.

4. The display device of claim 3, wherein the first segment body, the second segment body, and the first connection portion include a same material.

5. The display device of claim 1,
wherein the first grid pattern portion includes a pattern portion including the slits and a flat plate portion including the segment bodies,
wherein the pattern portion and the flat plate portion are alternately and repeatedly disposed.

6. The display device of claim 5, wherein the segment bodies include: an attachment portion attached to the flat plate portion; and
a body portion disposed on a lower side of the attachment portion, and a width in the first direction of the attachment portion is less than a width in the first direction of the body portion which is configure to contact a roller.

7. The display device of claim 6, wherein
the attachment portion of the first segment body and the attachment portion of the second segment body are integrally connected through the first connection portion, and
the body portion of the first segment body and the body portion of the second segment body are spaced apart from each other in the first direction.

8. The display device of claim 7, wherein the first connection portion has a shape bent at least once.

9. The display device of claim 1, wherein
the display panel further includes:
a folding area disposed on another side of the first active area and folded based on a folding axis in the second direction; and
a third active area disposed opposite to the first active area with the folding area disposed between the third active area and the first active area, and
the support plate includes:
a second plate portion overlapping the third active area in plan view; and
a second grid pattern portion overlapping the folding area in plan view and having slits penetrating through the support plate.

10. The display device of claim 9, wherein a thickness of the support plate is less than a thickness of the segment bodies.

11. The display device of claim 10, wherein
the thickness of the support plate is about 100 μm or more and about 150 μm or less, and
the thickness of the segment bodies is about 0.4 mm or more and about 1.3 mm or less.

12. The display device of claim 11, wherein the segment bodies do not overlap the second grid pattern portion in plan view.

13. An electronic device comprising:
a display panel including a planarization area and a bendable area adjacent to the planarization area in a first direction;
a plate supporting a bottom surface of the planarization area of the display panel; and
segment bodies supporting the bendable area of the display panel, extending in a second direction intersecting the first direction and spaced apart from each other in the first direction, and including a protrusion area protruding from the bendable area in a third direction intersecting a plane defined by the first direction and the second direction,
wherein the segment bodies include a first segment body and a second segment body adjacent to the first segment body,
wherein the protrusion area of the first segment body and the protrusion area of the second segment body are connected through a first connection portion disposed between the protrusion area of the first segment body and the protrusion area of the second segment body,
wherein the bendable area is rollable about a roll axis extending in a direction intersecting the first direction and the roll axis is slidable in a different direction intersecting the second direction.

14. The electronic device of claim 13,
wherein the planarization area includes at least one of a fixed portion or a foldable portion, wherein the bendable area extends to at least two outer corners of the display panel,
wherein each of the first segment body and the second segment body includes a support area overlapping the bendable area of the display panel in plan view,
wherein the support area of the first segment body and the support area of the second segment body are integrally connected through a second connection portion disposed between the support area of the first segment body and the support area of the second segment body.

15. The electronic device of claim 14,
wherein the planarization area includes the at least one foldable portion,
wherein the direction intersecting the first direction is the second direction,
wherein the direction intersecting the second direction is the first direction,
wherein the first connection portion prevents deformation of the first segment body and the second segment body that occur as the bendable area of the display panel is bent.

16. The display electronic device of claim 13, wherein the segment bodies include:
an attachment portion attached to a bottom surface of the bendable area of the display panel and a body portion disposed on a lower side of the attachment portion, and
a width in the first direction of the attachment portion is less than a width in the first direction of the body portion which is configure to contact a roller.

17. The electronic device of claim 16, wherein
the attachment portion of the first segment body and the attachment portion of the second segment body are integrally connected through the first connection portion, and
the body portion of the first segment body and the body portion of the second segment body are spaced apart from each other in the first direction.

18. A storage container for storing a display panel, the storage container comprising:
a first storage portion;
a second storage portion sliding from the first storage portion in a first direction and having a guide rail guiding a sliding of the display panel; and
segment bodies extending in a second direction intersecting the first direction and including a guide area engaged with the guide rail, and spaced apart from each other in the first direction,
wherein the segment bodies include a first segment body and a second segment body adjacent to the first segment body,
wherein the guide area of the first segment body and the guide area of the second segment body are connected through a connection portion disposed between the guide area of the first segment body and the guide area of the second segment body,
wherein the segment bodies are rollable about a roll axis extending in a direction intersecting the first direction and the roll axis is slidable in a different direction intersecting the second direction.

19. The storage container of claim 18,
wherein the first storage portion includes at least one of a fixed support or a foldable support for the display panel,
wherein the roll axis is slidable relative to the first storage portion and fixed relative to the second storage portion,
wherein the direction intersecting the first direction is the second direction, wherein each of the segment bodies includes a body portion and a protrusion portion protruding from the body portion in a thickness direction, wherein a width in the first direction of the protrusion portion is less than a width in the first direction of the body portion which is configured to contact a roller disposed along the roll axis in the second storage portion.

20. The storage container of claim 19, wherein the first storage portion includes the at least one foldable support for the display panel, wherein the direction intersecting the second direction is the first direction, wherein the segment bodies extend to at least two outer corners of the display panel, wherein the protrusion portion of the first segment body and the protrusion portion of the second segment body are integrally connected through the connection portion, wherein the body portion of the first segment body and the body portion of the second segment body are spaced apart from each other in the first direction.

\* \* \* \* \*